US012255859B2

(12) United States Patent
Soman et al.

(10) Patent No.: US 12,255,859 B2
(45) Date of Patent: *Mar. 18, 2025

(54) MESSAGE MODERATION IN A COMMUNICATION PLATFORM

(71) Applicant: Salesforce, Inc., San Francisco, CA (US)

(72) Inventors: Siddhi Soman, San Francisco, CA (US); Corey Baker, New Westminster (CA); Jessica Fain, Berkeley, CA (US); Stephen Burgess, Berkeley, CA (US); Matthew Hodgins, Toronto (CA); Himanshu Sharma, Ajax (CA); Sri Mahesh Vutukuri, Tracy, CA (US); Nicole Fish, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/334,533

(22) Filed: Jun. 14, 2023

(65) Prior Publication Data
US 2023/0344787 A1 Oct. 26, 2023

Related U.S. Application Data

(63) Continuation of application No. 17/321,962, filed on May 17, 2021, now Pat. No. 11,722,446.

(51) Int. Cl.
*H04L 51/212* (2022.01)
*G06F 3/0484* (2022.01)
*G06F 40/166* (2020.01)

(52) U.S. Cl.
CPC .......... *H04L 51/212* (2022.05); *G06F 3/0484* (2013.01); *G06F 40/166* (2020.01)

(58) Field of Classification Search
None
See application file for complete search history.

(56) References Cited

U.S. PATENT DOCUMENTS 6,076,100 A * 6/2000 Cottrille .................. H04L 43/00
                                                                                 709/219
7,720,853 B1 * 5/2010 Siegel .................... H04L 51/212
                                                                                 707/754

(Continued)

OTHER PUBLICATIONS

U.S. Appl. No. 16/993,859, filed Aug. 14, 2020, Butterfield, et al., "Electronic Board Associated With a Communication Platform", 45 pages.

(Continued)

*Primary Examiner* — Backhean Tiv
(74) *Attorney, Agent, or Firm* — Lee & Hayes, P.C.

(57) ABSTRACT

Message moderation is described herein. In an example, a message posted to a virtual space of a communication platform can be flagged for review by a reviewer (e.g., an administrator or other user permissioned to review messages). In some examples, such a reviewer can review a flagged message and determine one or more actions to be performed. Such actions can include removing the message from presentation via the communication platform, modifying presentation of the message via a user interface of the communication platform, replying to the message (e.g., to suggest taking the conversation offline or to another virtual space), disabling interaction with the message, and/or the like. Message moderation, as described herein, can streamline resolution of conversations that become out of hand and/or off topic.

20 Claims, 16 Drawing Sheets

(56) References Cited

U.S. PATENT DOCUMENTS

| | | | | |
|---|---|---|---|---|
| 8,825,777 | B2* | 9/2014 | DeLuca | G06Q 50/01 |
| | | | | 709/206 |
| 8,838,719 | B1* | 9/2014 | Faulk | H04L 51/212 |
| | | | | 709/204 |
| 8,977,685 | B2* | 3/2015 | Kanter | H04L 67/10 |
| | | | | 709/224 |
| 9,485,212 | B1* | 11/2016 | Bastide | H04L 51/224 |
| 9,524,490 | B2* | 12/2016 | Rubinstein | H04L 51/212 |
| 10,268,769 | B2* | 4/2019 | DeLuca | G06F 16/9535 |
| 10,402,371 | B2* | 9/2019 | Johnston | H04L 67/1097 |
| 10,469,275 | B1* | 11/2019 | Broomall | H04L 51/52 |
| 10,541,828 | B2* | 1/2020 | Bastide | G06F 40/30 |
| 10,600,027 | B2* | 3/2020 | Nicholas | G06Q 10/10 |
| 10,621,218 | B2* | 4/2020 | Klemm | G06F 16/3329 |
| 10,742,580 | B2* | 8/2020 | Brahmanapalli | H04L 51/212 |
| 10,891,539 | B1* | 1/2021 | Kearney | G06V 10/776 |
| 11,017,046 | B2* | 5/2021 | Pasternack | G06F 16/9535 |
| 11,057,339 | B1* | 7/2021 | Stoddart | H04L 51/222 |
| 11,128,589 | B1* | 9/2021 | Evans | H04L 51/214 |
| 11,290,408 | B2* | 3/2022 | Vasamsetti | H04L 51/56 |
| 11,423,265 | B1* | 8/2022 | Chen | G06T 11/00 |
| 11,671,392 | B2* | 6/2023 | Soman | H04L 51/23 |
| | | | | 715/733 |
| 11,722,446 | B2* | 8/2023 | Soman | H04L 51/23 |
| | | | | 709/206 |
| 2011/0137845 | A1* | 6/2011 | Ward | H04L 51/226 |
| | | | | 706/50 |
| 2011/0258561 | A1* | 10/2011 | Ladouceur | H04L 51/52 |
| | | | | 715/753 |
| 2012/0272143 | A1* | 10/2012 | Gillick | G06Q 10/10 |
| | | | | 715/256 |
| 2013/0055101 | A1* | 2/2013 | Sabur | G06Q 10/10 |
| | | | | 715/739 |
| 2013/0159443 | A1* | 6/2013 | Dellenbach | H04L 51/043 |
| | | | | 709/206 |
| 2013/0262564 | A1* | 10/2013 | Wall | H04N 21/812 |
| | | | | 709/203 |
| 2014/0156748 | A1* | 6/2014 | Allen | G06Q 50/01 |
| | | | | 709/204 |
| 2015/0067076 | A1* | 3/2015 | Bounds | H04L 67/535 |
| | | | | 709/206 |
| 2015/0113080 | A1* | 4/2015 | Faulk | H04L 51/212 |
| | | | | 709/206 |
| 2015/0309987 | A1* | 10/2015 | Epstein | G06F 40/30 |
| | | | | 704/9 |
| 2015/0312199 | A1* | 10/2015 | Bastide | G06F 16/285 |
| | | | | 715/752 |
| 2015/0312201 | A1* | 10/2015 | Bastide | H04L 51/52 |
| | | | | 709/204 |
| 2015/0371341 | A1* | 12/2015 | Iyer | H04L 51/52 |
| | | | | 705/319 |
| 2016/0127291 | A1* | 5/2016 | Kassab | H04L 51/214 |
| | | | | 709/206 |
| 2016/0171097 | A1* | 6/2016 | Nicholas | G06Q 10/10 |
| | | | | 707/740 |
| 2016/0234147 | A1* | 8/2016 | Joel | H04W 4/60 |
| 2016/0269342 | A1* | 9/2016 | Bank | H04L 51/52 |
| 2016/0294753 | A1* | 10/2016 | Centner | H04L 51/212 |
| 2016/0301705 | A1* | 10/2016 | Higbee | H04L 51/42 |
| 2016/0366080 | A1* | 12/2016 | Bastide | H04L 51/212 |
| 2017/0070458 | A1* | 3/2017 | Kunieda | G06Q 50/01 |
| 2017/0099291 | A1* | 4/2017 | Clark | H04L 63/126 |
| 2017/0222960 | A1* | 8/2017 | Agarwal | G06Q 10/107 |
| 2017/0250931 | A1* | 8/2017 | Ioannou | H04L 67/52 |
| 2017/0373999 | A1* | 12/2017 | Abou Mahmoud | |
| | | | | G06Q 10/0631 |
| 2018/0048617 | A1* | 2/2018 | Bastide | H04W 4/14 |
| 2018/0254913 | A1* | 9/2018 | Bastide | G06F 40/279 |
| 2018/0254914 | A1* | 9/2018 | Bastide | H04L 12/1827 |
| 2018/0255010 | A1* | 9/2018 | Goyal | H04L 51/212 |
| 2018/0260782 | A1* | 9/2018 | Bay | H04L 51/56 |
| 2018/0287982 | A1 | 10/2018 | Draeger et al. | |
| 2019/0098087 | A1* | 3/2019 | Johnston | G06F 16/13 |
| 2019/0188656 | A1* | 6/2019 | James | G06Q 20/381 |
| 2019/0205810 | A1* | 7/2019 | Pojar | H04L 51/046 |
| 2020/0005242 | A1* | 1/2020 | Nagaraj | H04L 67/306 |
| 2020/0293585 | A1* | 9/2020 | Pasternack | G06F 40/232 |
| 2021/0119951 | A1* | 4/2021 | Santos | G06F 40/284 |
| 2021/0133681 | A1* | 5/2021 | Dhaliwal | G06Q 10/101 |
| 2021/0203771 | A1* | 7/2021 | Innocenti | H04W 4/12 |
| 2021/0234827 | A1* | 7/2021 | Waldman | G06Q 10/1097 |
| 2022/0164472 | A1* | 5/2022 | Cannon | G06F 21/6245 |
| 2022/0182346 | A1* | 6/2022 | Yarnall | H04L 51/52 |
| 2022/0368657 | A1* | 11/2022 | Soman | G06F 3/0481 |
| 2022/0368658 | A1* | 11/2022 | Soman | H04L 51/23 |
| 2023/0344787 | A1* | 10/2023 | Soman | G06F 3/048 |

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Office Action for U.S. Appl. No. 17/322,173, mailed on Oct. 1, 2021, Soman, "Disabling Interaction With Messages in a Communication Platform", 21 Pages.

Office Action for U.S. Appl. No. 17/321,962, mailed on Dec. 9, 2022, Soman, "Message Moderation in a Communication Platform", 13 pages.

Office Action for U.S. Appl. No. 17/322,173, mailed on Apr. 13, 2022, Soman, "Disabling Interaction With Messages in a Communication Platform", 25 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

(56) References Cited

OTHER PUBLICATIONS

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

\* cited by examiner

MESSAGE MODERATION IN A COMMUNICATION PLATFORM

CROSS REFERENCE TO RELATED APPLICATIONS

This application is a continuation of and claims priority to commonly assigned, co-pending U.S. patent application Ser. No. 17/321,962, filed May 17, 2021. Application Ser. No. 17/321,962 is fully incorporated herein by reference in its entirety.

TECHNICAL FIELD

A communication platform can leverage a network-based computing system to enable users to exchange data. In an example, users of the communication platform can communicate with other users via channels, direct messages, and/or other virtual spaces. A channel, direct message, and/or other virtual space can be a data route used for exchanging data between and among systems and devices associated with the communication platform. For example, a channel may be established between and among various user computing devices, allowing the user computing devices to communicate and share data between and among each other over one or more networks. That is, in some examples, the communication platform can be a channel-based platform and/or hub for facilitating communication between and among users. In some examples, data associated with a channel, a direct message, and/or other virtual space can be presented via a user interface. In some examples, the user interface can present a data feed indicating messages posted to and/or actions taken with respect to a particular channel, direct message, and/or other virtual space.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
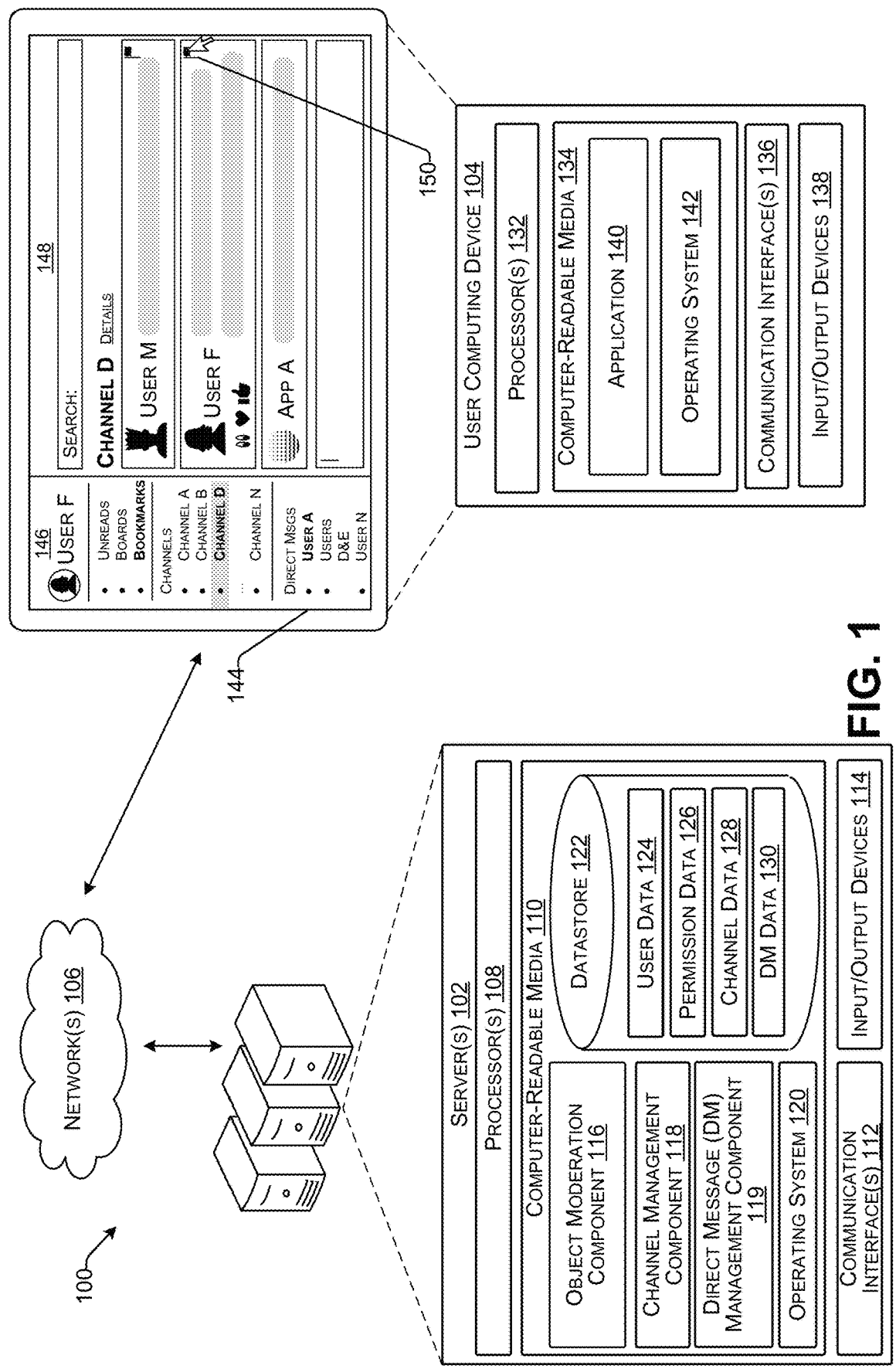
FIG. 1 illustrates an example environment for performing techniques described herein.

Moderating messages and other communications in a communication platform is described herein. The communication platform, which, in some examples can be a group-based communication platform, a channel-based communication platform, a permission-based communication platform, a channel-based messaging platform, and/or any other platform for facilitating communication between and among users, can enable users to exchange messages and/or other data via the communication platform. Communications within a channel, direct message, board, or the like can get out of hand (e.g., inappropriate, offensive, etc.) and/or off topic. Such out of hand and/or off topic communications can lead to policy violations and, in some examples, can damage relationships. In some examples, such out of hand and/or off topic communications can waste computing resources required for sending, receiving, and/or posting such communications via the communication platform and/or can clutter user interfaces associated with the communication platform. Techniques described herein enable users to easily report or "flag" messages or other communications for review and remedial action, if appropriate.

Current techniques lack tools to productively handle communications that get out of hand and/or off topic. For instance, in current techniques, a user that receives a message that warrants review is required to identify an administrator user and message an administrator user to review the message. This existing process can be labor intensive, often requiring a reporting user to interact with a user interface of the communication platform multiple times. Further, in existing techniques, when administrator users are alerted, they do not have any context with respect to the message at issue. That is, existing techniques are inadequate for identifying and/or moderating communications that can get out of hand and/or off topic.

Techniques described herein, however, enable users to easily report or "flag" objects for review and remedial action, if appropriate. In at least one example, an "object" as used herein can correspond to a message, a group of messages (e.g., a portion of a channel or direct message, a thread, etc.), a file, an image or video, and/or the like. In some examples, a flagged object can be routed to an administrator user or other permissioned user for review. In some examples, flagged objects can be associated with a channel that is designated for reviewing flagged objects. In at least one example, the review channel can be associated with one or more members that are associated with a set of permissions to enable review of flagged objects, as described above. In at least one example, reviewers (e.g., administrator user(s) and/or other permissioned user(s)) can review flagged objects and perform one or more actions associated with such flagged objects, which, in some examples, can be remedial. As described above, the one or more actions can include responding to a flagged object, removing a flagged object, modifying presentation of the flagged object, disabling interaction with or replies to the flagged object, and/or the like. In some examples, when interaction with a flagged object is disabled, the ability for users to react via an emoji or reactji, comment via a reply, share, edit, delete, and/or otherwise interact with a flagged object can be disabled, at least temporarily.

As described above, techniques described herein can support transparent and productive communication using the communication platform. Further, techniques described herein relate to methods and systems for flagging objects for review and/or remedial action. In some examples, techniques described herein can enable users to identify when communications should be paused and/or redirected for communications that have become out of hand and/or off topic. In at least one example, techniques described herein can enable administrator users or other permissioned users to direct communication to a particular virtual space (e.g., a different channel, a live meeting, a smaller group, etc.). In at least one example, techniques described herein can enable administrator users or other permissioned users to pause communications that have become unproductive or hurtful, such as by modifying presentation of particular objects, disabling interaction with objects, and/or the like.

Techniques described herein can provide improvements to existing technologies. As described above, with current techniques, a user is required to identify an administrator user and send a direct communication to the administrator user to request the administrator user to review a particular message (or other object). The administrator user may not have any context to understand why the particular message was flagged. Further, the reporting user has no way of flagging the message anonymously. Once reported, in existing techniques, the only course of remedial action for the administrator user may be to delete the message or archive an entire virtual space. This can cause confusion for users of the communication platform, which can cause a poor user experience.

Techniques described herein, however, can reduce interactions with a user interface by providing improvements to the user interface that enable users to flag an object for review while the object is being viewed. Further, as described below, a flagged object can be routed to an administrator user or other permissioned reviewer with functionality to enable the reviewers to perform an action associated with the flagged object. In some examples, the flagged object can be associated with context to such that a reviewer can have information relevant for determining what, if any, remedial action is to be taken with respect to the flagged message.

Furthermore, techniques described herein can offer improvements to user interfaces by flagging conversations in long running threads that become very difficult to follow after too many contributions. That is, threads that become off topic or out of control can be flagged and re-directed to enable users to more easily identify relevant conversations and/or data without extensive scrolling and/or without having to navigate through irrelevant objects.

While "messages" are referenced herein as being flaggable or otherwise identifiable for review, techniques described herein are similarly applicable to any communication object, or portion thereof, such as a portion of a message, a thread (e.g., one or more messages associated with a same root message), a file, a snippet of content, a document, a channel, a direct message, a board, and/or the like. That is, techniques described herein are not limited to moderating messages and/or content associated therewith.

FIG. 1 illustrates an example environment 100 for performing techniques described herein. In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users of the communication platform to exchange data. In at least one example, the communication platform can be "group-based" such that the platform, and associated systems, channels, messages, and/or virtual spaces, have security (that can be defined by permissions) to limit access to defined groups of users, such as a defined group of users having, for instance, sole access to a given communication channel. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message, or otherwise communicate between or among each other within secure and private virtual spaces, such as channel(s), direct message(s), board(s), and/or the like.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces.

In some examples, an organization can be associated with multiple workspaces and/or a workspace can be associated with multiple organizations.

In at least one example, the server(s) 102 can communicate with a user computing device 104 via one or more network(s) 106. That is, the server(s) 102 and the user computing device 104 can transmit, receive, and/or store data (e.g., content, messages, data, or the like) using the network(s) 106, as described herein. In some examples, the user computing device 104 can comprise a "client" associated with a user. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., administrator, team leader, etc.) and/or types (e.g., verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include an object moderation component 116, a channel management component 118, a direct message management component 119, an operating system 120, and a datastore 122.

In at least one example, the object moderation component 116 can facilitate message moderation in association with the communication platform. In at least one example, the object moderation component 116 can associate affordances with user interface elements representative of objects, such as messages and/or other communication objects. In some examples, an affordance can be a user interface element that is interactable to enable a user to trigger a review process in association with an object. In some examples, affordances can be associated with each object associated with the communication platform. In some examples, the object moderation component 116 can associate affordances with some objects and refrain from associating affordances with other objects. For example, the object moderation component 116 can associate an affordance with objects posted by users but may refrain from associating affordances with objects that are posted by applications or bots. In some examples, the object moderation component 116 can refrain from associating affordances with objects that are automatically generated. In at least one example, for a particular user, the object moderation component 116 can associate an affordance with objects posted by other users but may refrain from associating affordances with objects that are posted by the particular user. Selectively associating affordances with objects can enable moderation of objects without cluttering the user interface and/or expending computing resources unnecessarily (e.g., a user is not likely to moderate their own message and/or messages from applications and/or bots should not be off topic, inappropriate, or otherwise out of hand).

In some examples, an affordance can be a particular user interface element associated with an actuation mechanism. In such examples, actuation of the actuation mechanism can trigger a review process. In some examples, an affordance can be associated with a user interface element that is associated with an actuation mechanism that, when actuated, can cause one or more actions to be presented via a user interface. Such action(s) can include flagging an object for review, editing an object, deleting an object, pinning an object, etc. In at least one example, a user can select an action associated with flagging an object to trigger the review process. In at least one example, interaction with the affordance can generate a request that can be sent to the server(s) 102 and received by the object moderation component 116. The request can identify an object and can include an indication that the object has been flagged for review. Such objects can be referred to herein as "flagged" objects. In some examples, a portion of an object can be flagged for review. For example, a file, an image, a video, or other object associated with an object can be flagged for review.

In at least one example, in response to receiving a request to review an object, the object moderation component 116 can determine whether a user who flagged the object has permission to do so. In some examples, such a check can determine whether the flagging (or requesting) user has permission to view the object (e.g., based on group membership, channel membership, etc.). In at least one example, based at least in part on determining that the user is permissioned to flag the object for review, the object moderation component 116 can initiate a review process as described herein.

In at least one example, based at least in part on receiving a request to review an object, the object moderation component 116 can route the object to a user permissioned to review the object. In some examples, users of the communication platform can be associated with permissions which can control access to objects. In some examples, permissions can be based on user identifier, group identifier, channel identifier, direct message identifier, board identifier, and/or the like. That is, individual users, groups of users, channels, direct messages, boards, etc. can be associated with particular permissions. In some examples, permissions can be based on user type and/or role. For example, individual users can be associated with user types and/or roles, such as administrator user, reviewer, etc. For the purpose of this discussion, users who are associated with permissions to grant them the ability to review objects and/or perform one or more actions relative thereto can be referred to as "reviewers."

In at least one example, the object moderation component 116 can send an object that has been flagged for review directly to a client of a reviewer. In at least one example, a reviewer can receive a notification associated with an object that has been flagged for review. Such a notification can include a link to the object and/or another mechanism for reviewing the object.

In some examples, the object moderation component 116 can associate a flagged object with a channel for reviewing flagged objects. In some examples, the channel can be a default channel configured for receiving flagged objects. In some examples, the channel can be designated by an administrator or other users for receiving flagged objects. In at least one example, a "review channel" can be a private channel such that users who are not members of the review channel cannot access data associated with the review channel and/or cannot find the review channel (e.g., via a search or the like). In some examples, the review channel can be associated with one or more members who are permissioned to access objects associated with the review channel and/or perform actions associated with objects in the review channel. In some examples, the review channel can be accessible to users having particular user types and/or roles (e.g., administrator users, reviewers, etc.), such that users having such particular user types and/or roles can be members of the review channel.

In at least one example, a flagged object can be "routed to" a review channel such that the flagged object is copied to the review channel. That is, the object moderation component 116 can duplicate a flagged object and associate the duplicated flagged object with the review channel. In some examples, the flagged object can be presented with context data. For example, the flagged object can be presented with an indication of the virtual space (e.g., channel, direct message, board, etc.) the flagged object is associated with, a sender or originator of the flagged object, interactions with the flagged object, and/or the like. In at least one example, a user interface element representative of the flagged object, presented via a user interface as described below, can be associated with one or more affordances to enable a reviewer to perform one or more actions with respect to the flagged object. As described above, the one or more actions can include removing an object from a virtual space, modifying presentation of an object (e.g., obfuscating at least a portion of the object), replying to an object, disabling interaction with at least an object (e.g., disabling reactions, replies, editing, deleting, sharing, etc.), etc. In at least one example, in response to receiving an input associated with an action to be performed in association with an object, the object moderation component 116 can perform the action and send an indication associated therewith to each client via which the object is presented (e.g., via an event notification or a real-time event notification). In some examples, an input can be associated with an instruction to perform an associated action. The object moderation component 116 can perform the action based at least in part on receiving the instruction and can send an indication associated with the action (e.g., which can be an instruction to update an instance of a user interface) to each client via which the object is presented, as described above. In some examples, such an indication can be batched with an existing communication to be sent to a client. In some examples, such an indication can be sent in real-time or near real-time. In some examples, an action can be "no action," such that if the reviewer determines that an object does not warrant an action and/or has otherwise been resolved, the reviewer can take no action and, in some examples, can indicate that the review is complete.

In some examples, if an object is posted to a shared virtual space (e.g., a shared channel, a direct message with members from different organizations, a shared board, etc.), the object moderation component 116 can determine which group a flagging user belongs to (e.g., based on a group identifier) and can route the flagged object to a permissioned reviewer and/or review channel associated with the group with which the flagging user is associated. In some examples, however, permissioned reviewers may be restricted (e.g., based on permissions) with respect to actions that can be performed on an object that was posted by, or otherwise originates from, another organization or workspace.

Techniques described above with reference to flagging objects for review are described in the context of manual flagging of objects. However, in some examples, the object moderation component 116 can analyze data associated with objects to determine when an object should be reviewed (e.g., automatically/without requiring manual input). That is, in some examples, the object moderation component 116 can parse objects using natural language processing, image recognition, and/or the like. In at least one example, the object moderation component 116 can utilize one or more models, which can be trained via machine-learning mechanisms (e.g., unsupervised, semi-supervised, supervised, deep, etc.), to determine whether an object should be flagged for review. In some examples, the one or more models can be trained on objects that have previously been posted or exchanged via the communication platform and/or audit logs indicating previously flagged objects, previously removed objects, previously modified objects, previously disabled objects, previously dismissed flagged objects, and/or the like. In some examples, the object moderation component 116 can utilize the model(s) to detect when an object is associated with a particular key word, image, file, etc. such that it should be reviewed.

In some examples, the model(s) can be trained to output a binary indication (e.g., flag or don't flag). In such examples, if the output is "flag," the object can be flagged for review and routed to a reviewer and/or channel as described above. In some examples, the model(s) can be trained to output a score and/or other metric. Such a score or other metric can be an indication of whether an object is off topic, out of line, inappropriate, offensive, and/or the like. In some examples, the model(s) can output individual score(s) or other metric(s). In at least one example, based at least in part on a determination that a score or other metric meets or exceeds a threshold, the object moderation component 116 can flag an associated object for review and the object can be routed to a reviewer and/or channel as described above.

In some examples, flagged objects can be stored in the datastore 122. In at least one example, the object moderation component 116 can manage storage, retrieval, and/or access to flagged objects. In at least one example, a flagged object can be associated with a user identifier of a user who flagged the object, a user identifier of a user who reviewed and/or performed an action associated therewith, a timestamp of the review and/or action performed, a channel identifier, a direct message identifier, a board identifier, and/or the like.

In at least one example, the channel management component 118 can manage channels of the communication platform. In at least one example, the communication platform can be "channel-based" such that the platform can be organized into channels having security (that can be defined by permissions) to limit access to defined groups of users (e.g., members of the channels). A channel, or virtual space, can be a data route used for exchanging data between and among systems and devices associated with the communication platform, such as, for example, content and/or messages. In some examples, a channel may be "public," which may allow any user within a group (e.g., associated with an organization identifier, associated with a workspace identifier, etc.) with which the channel is associated to join and participate in the data sharing through the channel. In some examples, a channel may be "private," which may restrict data communications in the channel to certain users or users having particular roles (e.g., managers, administrators, etc.) and/or types (e.g., verified, etc.). In some examples, a channel may be an "announcement" channel, which may restrict communication in the channel to announcements or may otherwise be associated with announcements instead of other more granular topics of other channels.

In at least one example, a channel can be associated with a defined group of users within the same organization. Such a channel can be an "internal channel" or an "internally shared channel." In some examples, a channel may be "shared" or "externally shared," which may allow users associated with two or more different groups (e.g., entities associated with two or more different organization and/or workspace identifiers) to join and participate in the data sharing through the channel. A shared channel may be public such that it is accessible to any user of groups associated with the shared channel, or may be private such that it is restricted to access by certain users or users having particular roles and/or types. A "shared channel" or an "externally shared channel" can enable two or more organizations, such as a first organization and a second organization to share data, exchange communications, and the like (hence, a "shared" channel or an "externally shared channel" can refer to a channel which is accessible across different organizations, whereas an "internal channel" can refer to a communication channel which is accessible within a same organization). In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared channel can be shared with one or more different workspaces and/or organizations that, without having a shared channel, would not otherwise have access to each other's data by the nature of the permission-based and/or group-based configuration of the communication platform described herein.

In at least one example, the channel management component 118 can receive a request to generate a channel. In some examples, the request can include a name that is to be associated with the channel, one or more users to invite to join the channel, and/or permissions associated with the channel. In at least one example, one or more user identifiers associated with one or more users and/or one or more user accounts can be mapped to, or otherwise associated with, a channel (e.g., a channel identifier associated therewith). User(s) associated with a channel can be "members" of the channel. Members of a channel can communicate with other members via the channel. That is, in at least one example, the channel management component 118 can establish a channel between and among various user computing devices associated with user identifiers associated with the channel, allowing the user computing devices to communicate and share data between and among each other. As described herein, in some examples, such communication and/or sharing of data can be via one or more messages that can be exchanged via a channel. In at least one example, the channel management component 118 can manage such communications and/or sharing of data. In some examples, data associated with a channel can be presented via a user interface.

As described above, in at least one example, one or more permissions can be mapped to, or otherwise associated with, a channel and/or members associated therewith. Such permission(s) can indicate which user(s) have permission to access the channel, actions and/or messages permitted in the channel, which user(s) and/or type(s) of users are permitted to add or remove members, which user(s) and/or types of users are permitted to share the channel with other users, a retention policy associated with data in the channel, whether the channel is public or private, or the like.

In at least one example, the direct message management component 119 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform (e.g., content and/or messages). In some examples, a direct message can be a private message between two or more users of the communication platform. In some examples, a direct message may be "shared," which may allow users associated with two or more different groups (e.g., entities associated with two or more different organization and/or workspace identifiers) to join and participate in the data sharing through the direct message.

In at least one example, the direct message management component 119 can receive a request to generate a direct message. In some examples, the request can include identifiers associated with one or more users that are intended recipient(s) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more messages that can be exchanged via the direct message. In at least one example, the direct message management component 119 can manage such communications and/or sharing of data. In some examples, data associated with a direct message can be presented via a user interface.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one or multiple databases, which can include user data 124, permission data 126, channel data 128, and direct message (DM) data 130. Additional or alternative data may be stored in the datastore and/or one or more other datastores.

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations, groups, or entities with which the user is associated, one or more channel identifiers associated with channels to which the user has been granted access, one or more group identifiers for groups (or, organizations, teams, entities, or the like) with which the user is associated, an indication whether the user is an owner or manager of any channels, an indication whether the user has any channel restrictions, a plurality of messages, a plurality of emojis, a plurality of conversations, a plurality of conversation topics, an avatar, an email address, a real name (e.g., John Doe), a username (e.g., j doe), a password, a time zone, a status, and the like.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 126 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 126 can store data associated with permissions of individual channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the channel in the channel data 128. In some examples, permissions can indicate restrictions on individual channels, restrictions on user(s) associated with individual channels, and the like.

In at least one example, individual users can be associated with particular permissions, users having particular user types and/or roles (e.g., administrator users, reviewers, moderators, etc.) can be associated with particular permissions, objects (e.g., messages or otherwise) can be associated with particular permissions, virtual spaces can be associated with particular permissions, etc. That is, the permission data 126 can store various permissions for various components of the environment 100.

In at least one example, the channel data 128 can store data associated with individual channels. In at least one example, the channel management component 118 can establish a channel between and among various user computing devices, allowing the user computing devices to communicate and share data between and among each other. In at least one example, a channel identifier may be assigned to a channel, which indicates the physical address in the channel data 128 where data related to that channel is stored.

In at least one example, the DM data 130 can store data associated with individual direct messages. In at least one example, the direct message management component 119 can establish a direct message between and among various user computing devices, allowing the user computing devices to communicate and share data between and among each other via the direct message. In at least one example, a direct message identifier may be assigned to a direct message, which indicates the physical address in the DM data 130 where data related to that direct message is stored.

Messages posted, or otherwise sent and/or received, via channels, direct messages, etc. can be stored in associated with the channel data 128 and/or DM data 130. In some examples, such messages can additionally or alternatively be stored in association with the user data 124.

The datastore 122 can store additional or alternative types of data, which can include, but is not limited to board data (e.g., data posted to or otherwise associated with boards of the communication platform), interaction data (e.g., data associated with additional or alternative interactions with the communication platform), model(s) (e.g., trained as described herein), etc.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), channels, direct messages, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored and/or accessed. In some examples, a database shard can store data related to two or more groups (e.g., as in a shared channel, such as an externally shared channel).

In some examples, a channel can be associated with a database shard within the datastore 122 that stores data related to a particular channel identification. For example, a database shard may store electronic communication data associated with the channel, which enables members of that particular channel to communicate and exchange data with other members of the same channel in real time or near-real time. In this example, a group or organization can be the owner of the database shard and can control where and how the related data is stored and/or accessed.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real time or near-real time. In this example, a group or organization can be the owner of the database shard and can control where and how the related data is stored and/or accessed.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored and/or accessed.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), HypterText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In at least one example, the application 140 can be a native application associated with the communication platform. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in examples where the application 140 is described as performing an operation below, in an additional or alternative example, such an operation can be performed by another access point, such as a web browser or the like.

In at least one example, the user computing device 104 can correspond to a "client" of a user. In some examples, the user computing device 104 can be associated with multiple "clients," in which case, each instance of an application or other access point can be its own client. For example, a user can be signed into a first client (e.g., the application 140) and a second client (e.g., a web browser), both of which can be associated with the user computing device 104. In another example, the user can be signed into a first client (e.g., the application 140) and a second client, each of which can be on separate user computing devices.

As described above, a client, which can be associated with the user computing device 104, can present one or more user interfaces. A non-limiting example of a user interface 144 is shown in FIG. 1. As illustrated in FIG. 1, the user interface 144 can present data associated with one or more channels, direct messages, or other virtual spaces. In some examples, the user interface 144 can include a first section 146 (e.g., which can be a portion, pane, or other partitioned unit of the user interface 144), that includes user interface element(s) representing data associated with channel(s), direct message(s), etc. with which the user (e.g., account of the user) is associated. Additional details associated with the first section 146 and user interface element(s) are described below with reference to FIG. 2A.

In at least one example, the user interface 144 can include a second section 148 (e.g., which can be a portion, pane, or other partitioned unit of the user interface 144) that can be associated with a data feed (or, "feed") indicating messages posted to and/or actions taken with respect to one or more channels, direct messages, and/or other virtual spaces for facilitating communications (e.g., a virtual space associated with event(s) and/or action(s), etc.) as described herein. In at least one example, data associated with the second section 148 can be associated with the same or different workspaces. That is, in some examples, the second section 148 can present data associated with the same or different workspaces via an integrated data feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user (e.g., member of the channel) posted the message and/or performed an action. In examples where the second section 148 presents data associated with multiple workspaces, at least some data can be associated with an indication of which workspace the data is associated with.

In at least one example, the first section 146 and the second section 148, in combination, can be associated with a "group-based communication user interface" from which a user can interact with the communication platform. Additional details associated with the user interface 144, the first section 146, and the second section 148, are described below with reference to FIG. 2A.

In at least one example, objects, such as messages or other communication objects, can be associated with affordances, which can be provided via a user interface element, to enable a user to flag individual of the objects for review. An example of such a user interface element 150 is provided in FIG. 1. In at least one example, based at least in part on detecting an input associated with the user interface element 150, an associated message can be routed to an administrator or other user permissioned to review the message. In some examples, the message can be routed directly to a client of such a reviewer. In some examples, the message can be routed to a channel designated for messages that are to be reviewed. In such examples, the message can be copied and posted to such a channel. In at least one example, members of the channel can be permissioned to review the message and, if appropriate, perform one or more remedial actions with respect to the message. In some examples, such an action can comprise removing a message, obfuscating or otherwise modifying presentation of the message, replying to the message, disabling interaction with the message, and/or the like. Additional details are provided below.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, microphones, cameras, connection ports and so forth.

While techniques described herein are described as being performed by the object moderation component 116, the channel management component 118, the direct message management component 119, and the application 140, techniques described herein can be performed by any other component, or combination of components, which can be associated with the server(s) 102, the user computing device 104, or a combination thereof.

Figure 2A:
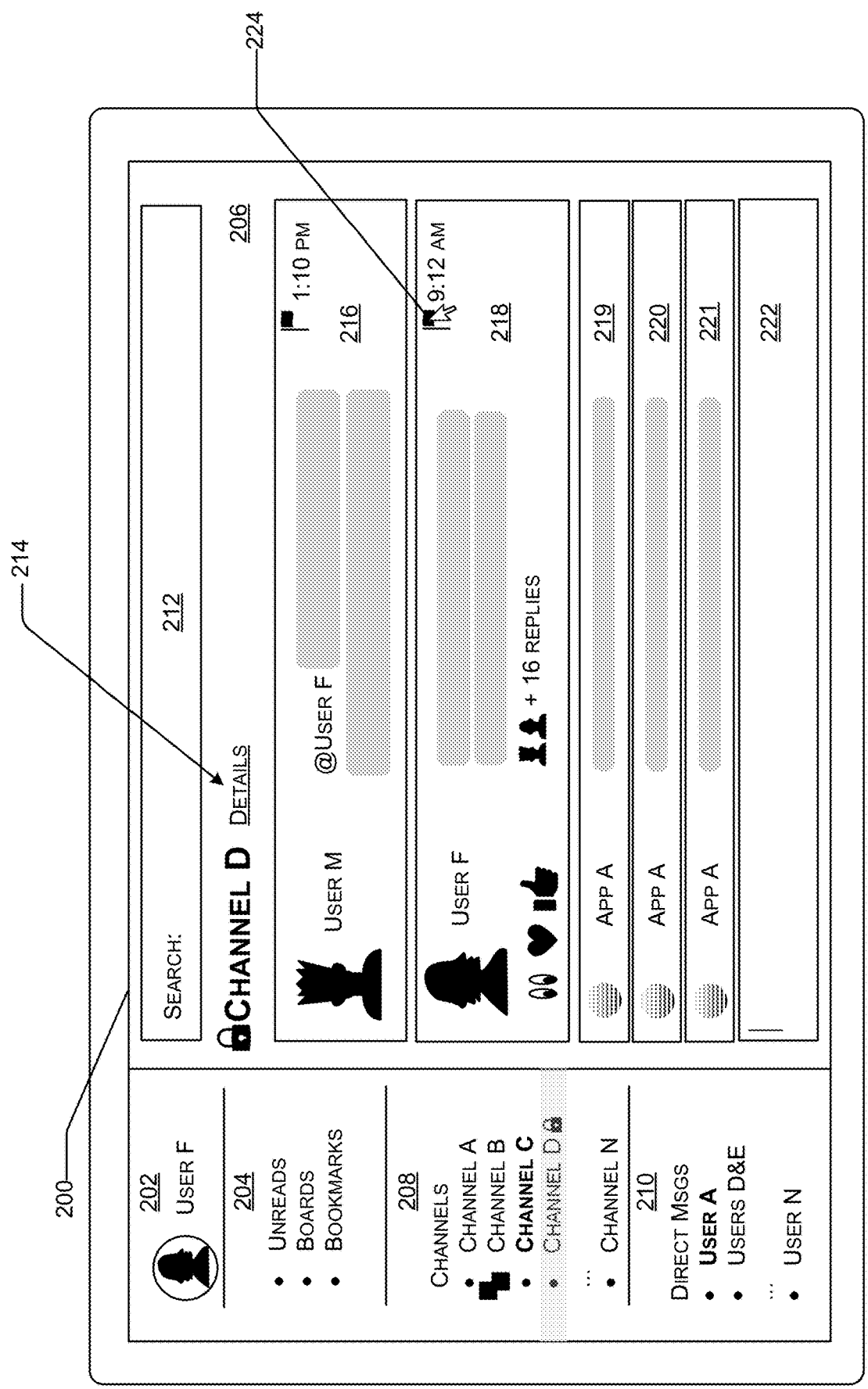
FIG. 2A illustrates an example user interface, from which an object, presented via a communication platform, can be flagged for review, as described herein.

FIG. 2A illustrates an example user interface 200 presented via a communication platform, as described herein. The user interface 200 can correspond to the user interface 144 described above with reference to FIG. 1. As described above, in some examples, a user interface 200 presented via the communication platform can include a first section 202 (which can correspond to the first section 146 described above with reference to FIG. 1) that includes user interface element(s) representing virtual space(s) associated with the workspace(s) with which the user (e.g., account of the user) is associated. In at least one example, the first section 202 can include one or more sub-sections, which can represent different virtual spaces. For example, a first sub-section 204 can include user interface elements representing virtual spaces that can aggregate data associated with a plurality of channels and/or workspaces. In at least one example, each virtual space can be associated with a user interface element in the first sub-section 204. In some examples, a user interface element can be associated with an actuation mechanism, that when actuated, can cause the application 140 to present data associated with the corresponding virtual space via a second section 206 of the user interface 200 (which can correspond to the second section 148 described above with reference to FIG. 1).

In at least one example, a virtual space can be associated with all unread data associated with each of the workspaces with which the user is associated. That is, in some examples, if the user requests to access the virtual space associated with "unreads," all data that has not been read (e.g., viewed)

by the user can be presented in the second section 206, for example in a feed. In another example, "threads" can be associated with messages, files, etc. posted in threads to messages posted in a channel and/or a virtual space associated with "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user.

In some examples, if the first sub-section 204 includes a user interface element representative of a virtual space associated with "snippets of content" (e.g., stories) that is actuated by a user, snippets of content associated with the user, which can be associated with different channels and/or virtual spaces, can be presented via the second section 206. In some examples, such snippets of content can be presented via a feed. For the purpose of this discussion, a snippet of content can correspond to audio and/or video content provided by a user associated with the communication platform.

In another example, a virtual space can be associated with "boards" with which the user is associated. In at least one example, if the user requests to access the virtual space associated with "boards," one or more boards with which the user is associated can be presented via the user interface 200 (e.g., in the second section 206). In at least one example, boards, as described herein, can be associated with individual groups and/or communication channels to enable users of the communication platform to create, interact with, and/or view data associated with such boards. That is, a board, which can be an "electronic board," can be a virtual space, canvas, page, or the like for collaborative communication and/or organization within the communication platform. In at least one example, a board can support editable text and/or objects that can be ordered, added, deleted, modified, and/or the like. In some examples, a board can be associated with permissions defining which users of a communication platform can view and/or edit the board. In some examples, a board can be associated with a communication channel and at least some members of the communication channel can view and/or edit the board. In some examples, a board can be sharable such that data associated with the board is accessible to and/or interactable for members of the multiple communication channels, workspaces, organizations, and/or the like.

In at least one example, a board can include section(s) and/or object(s). In some examples, each section can include one or more objects. In at least one example, an object can be associated with an object type, which can include, but is not limited to, text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein. As an example, sections and/or objects can be arranged to create a project board that can be used to generate and/or assign tasks, track progress, and/or otherwise manage a project. Further, in some examples, boards can present company metrics and also enable access to company goals so that such data can be stored and/or accessed via a single location. In some examples, boards can be used to keep track of work progress and/or career growth, which can be used by managers or supervisors for managing and/or supervising employees, agents, and/or other workers.

In at least one example, a board can be used to track incidents, incoming customer service requests, and/or the like. Additional details associated with boards are provided in U.S. patent application Ser. No. 16/993,859, filed on Aug. 14, 2020, the entire contents of which are incorporated by reference herein.

In some examples, data presented via the second section can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user (e.g., member of a channel) posted a message, performed an action, and/or the like. Additional details are described below.

In at least one example, the first section 202 of the user interface 200 can include a second sub-section 208 that includes user interface elements representing channels. In some examples, the channels can include public channels, private channels, shared channels (e.g., between workspaces or organizations), single workspace channels, cross-workspace channels, announcement channels, combinations of the foregoing, or the like. In some examples, the channels represented can be associated with a single workspace. In some examples, the channels represented can be associated with different workspaces (e.g., cross-workspace). In some examples, the channels represented can be associated with combinations of channels associated with a single workspace and channels associated with different workspaces.

In some examples, the second sub-section 208 can depict all channels, or a subset of all channels, that the user has permission to access (e.g., as determined by the permission data 126). In such examples, the channels can be arranged alphabetically, based on most recent interaction, based on frequency of interactions, based on channel type (e.g., public, private, shared, cross-workspace, announcement, etc.), based on workspace, in user-designated sections, or the like. In some examples, the second sub-section 208 can depict all channels, or a subset of all channels, that the user is a member of, and the user can interact with the user interface 200 to browse or view other channels that the user is not a member of but are not currently displayed in the second sub-section 208. In some examples, different types of channels (e.g., public, private, shared, etc.) can be in different sections of the second sub-section 208, or can have their own sub-sections in the user interface 200. In some examples, channels associated with different workspaces can be in different portions of the second sub-section 208, or can have their own sections or sub-sections in the user interface 200.

In some examples, the indicators can be associated with user interface elements that visually differentiate types of channels. For example, Channel B is associated with a double square user interface element instead of a circle user interface element. As a non-limiting example, and for the purpose of this discussion, the double square user interface element can indicate that the associated channel (e.g., Channel B) is an externally shared channel. In some examples, such a user interface element can be the same for all externally shared channels. In other examples, such a user interface element can be specific to the other group with which the externally shared channel is associated. In some examples, additional or alternative graphical elements can be used to differentiate between public channels, private channels, shared channels, channels associated with different workspaces, and the like. In other examples, channels that the user is not a current member of may not be displayed in the second sub-section 208 of the user interface 200. In such examples, the user may navigate to a different interface (not shown) to browse additional channels that are accessible to the user but to which the user is not currently a member.

In addition to the second sub-section 208, the first section 202 can include a third sub-section 210 that can include user interface elements representative of direct messages. That is, the third sub-section 210 can include user interface elements representative of virtual spaces that are associated with private messages between one or more users, as described above.

As described above, in at least one example, the user interface 200 can include a second section 206 that can be associated with data associated with virtual spaces of the communication platform. In some examples, data presented via the second section 206 can be presented as a feed indicating messages posted to and/or actions taken with respect to a channel and/or other virtual space (e.g., a virtual space associated with direct message communication(s), a virtual space associated with event(s) and/or action(s), etc.) for facilitating communications. As described above, in at least one example, data associated with the second section 206 can be associated with the same or different workspaces. That is, in some examples, the second section 206 can present data associated with the same or different workspaces via an integrated feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user posted the message and/or performed an action.

As described above, a "message" can refer to any electronically generated digital object provided by a user using the user computing device 104 and that is configured for display within a channel, a direct message, and/or another virtual space as described herein. In some examples, a user can comment on a message in a "thread." A thread can be a message associated with another message (e.g., a root message) that is not posted to a channel, direct message, or other virtual space, but instead is maintained within an object associated with the original message. Messages and/or threads can be associated with file(s), emoji(s), reactji(s), application(s), etc.

A channel, direct message, or other virtual space can be associated with data and/or content other than messages, or data and/or content that is associated with messages. For example, non-limiting examples of additional data that can be presented via the second section 206 of the user interface 144 include members added to and/or removed from the channel, file(s) (e.g., file attachment(s)) uploaded and/or removed from the channel, application(s) added to and/or removed from the channel, post(s) (data that can be edited collaboratively, in near real-time by one or members of a channel) added to and/or removed from the channel, description added to, modified, and/or removed from the channel, modifications of properties of the channel, etc.

In some examples, the second section 206 can comprise a feed associated with a single channel. In such examples, data associated with the channel can be presented via the feed. In at least one example, data associated with a channel can be viewable to at least some of the users of a group of users associated with a same group identifier. In some examples, for members of a channel, the content of the channel (e.g., messaging communications and/or objects) can be displayed to each member of the channel. For instance, a common set of group-based messaging communications can be displayed to each member of the channel such that the content of the channel (e.g., messaging communications and/or objects) may not vary per member of the channel. In some examples, messaging communications associated with a channel can appear differently for different users (e.g., based on personal configurations, group membership, permissions, policies, etc.).

In at least one example, the format of the individual channels or virtual spaces may appear differently to different users. In some examples, the format of the individual channels or virtual spaces may appear differently based on which workspace or organization a user is currently interacting with or most recently interacted with. In some examples, the format of the individual channels or virtual spaces may appear differently for different users (e.g., based on personal configurations, group membership, permission(s), etc.).

In at least one example, the user interface 200 can include a search mechanism 212, wherein a user can input a search term and the server(s) 102 can perform a search associated with the communication platform. In some examples, the search can be performed across each group with which the user is associated, or the search can be restricted to a particular group, based on a user specification.

In FIG. 2A, the user can interact with the user interface element that corresponds to Channel D in the second sub-section 208 and as such, a feed associated with the channel can be presented via the second section 206 of the user interface. In some examples, the second section 206 can be associated with a header that includes user interface elements 214 representing data associated with Channel D. Furthermore, the second section 206 can include user interface elements 216, 218, and 220 which each represent messages posted to the channel. As illustrated, the user interface elements 216-220 can include an indication of a user who posted the message, a time when the message was posted, content associated with the message, reactions associated with the message (e.g., emojis, reactjis, etc.), and/or the like. In at least one example, the second section 206 can include an input mechanism 222, which can be associated with a composition user interface to enable a user to compose a message to be posted to the channel. That is, in at least one example, a user can provide input via the input mechanism 222 (e.g., type, speak, etc.) to generate a new message.

As described above, in at least one example, the object moderation component 116 can associate affordances with user interface elements representative of objects. In some examples, such an affordance can be a user interface element 224 that is interactable to enable a user to trigger a review process in association with an object, such as the message represented by user interface element 218. As described above, in some examples, an affordance can be a particular user interface element, such as a flag icon, associated with an actuation mechanism, which is illustrated in FIG. 2A. In such examples, actuation of the actuation mechanism can trigger a review process.

Figure 2B:
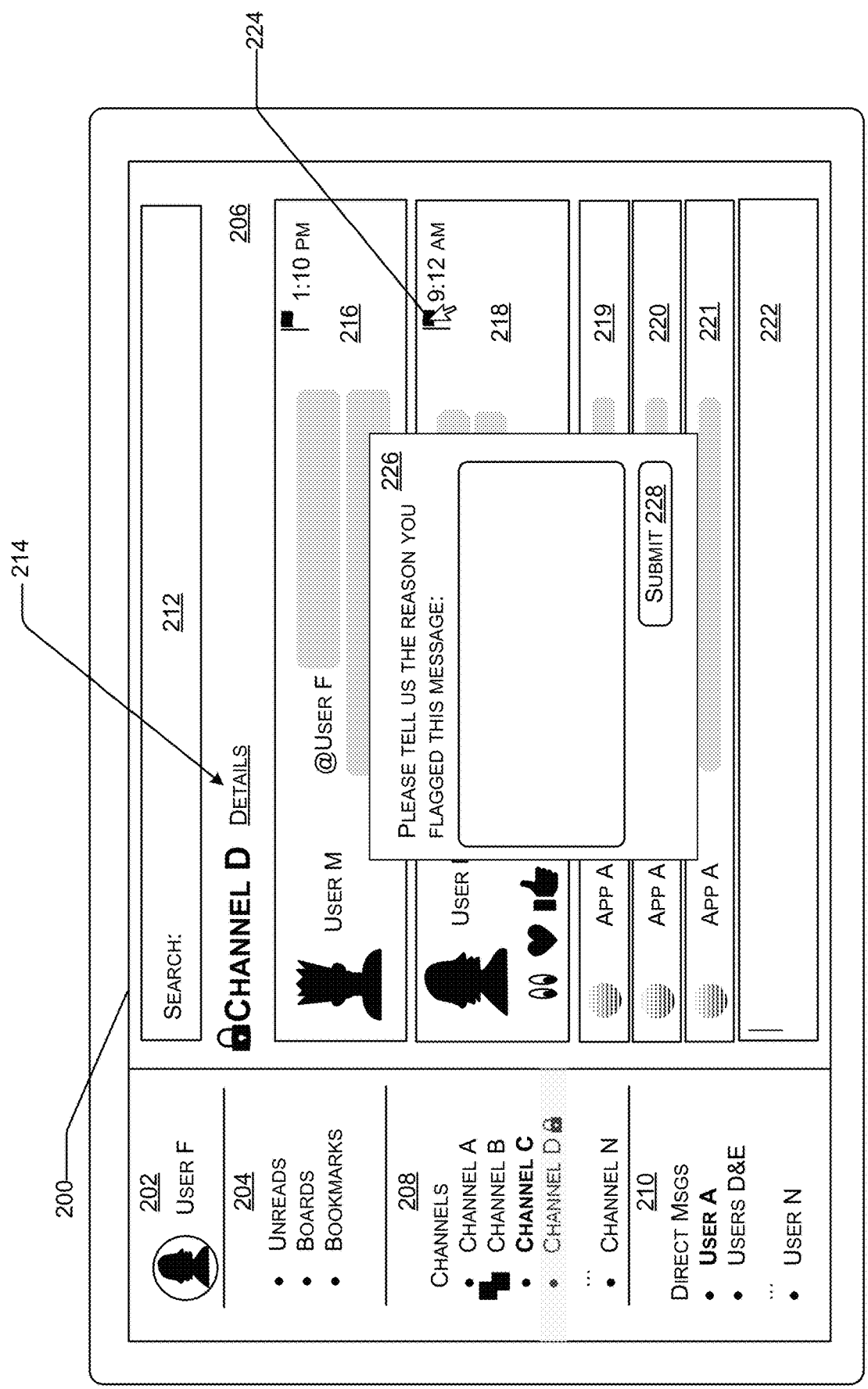
FIG. 2B illustrates another example of the user interface presented via the communication platform, as described herein, wherein a user interface element is presented to solicit feedback associated with a request to flag an object for review, as described herein.

In at least one example, based at least in part on detecting an interaction or actuation of an actuation mechanism associated with the user interface element 224 and/or otherwise receiving a request to review an object, the object moderation component 116 can cause display of a user interface element 226 via the user interface 200, as illustrated in FIG. 2B. In at least one example, the user interface element 226 can include an input mechanism to prompt the flagging user to input information associated with why the object was flagged. In some examples, such an input mechanism can be radio buttons or other selection mechanisms associated with various reasons (e.g., out of line, off topic, inappropriate, offensive, etc.). In some examples, such an input mechanism can be associated with a freeform text box to enable a user to provide reasons for flagging the object. In at least one example, the user interface element 226 can include an actuation mechanism 228 that, when actuated, can cause the reason or other information provided via the user interface element 226 to be sent to the object moderation component 116 (e.g., via the application 140). In some examples, input provided via the user interface element 226 can be presented in association with the object when presented for review by a reviewer.

In at least one example, when a user flags an object the identity of the user can be known to the reviewer. However, in some examples, the identity of the user can be confidential to the user who posted the flagged object. That is, the identity of the flagging user can be hidden, or otherwise unknown, to the user who posted the flagged object.

Figure 2C:
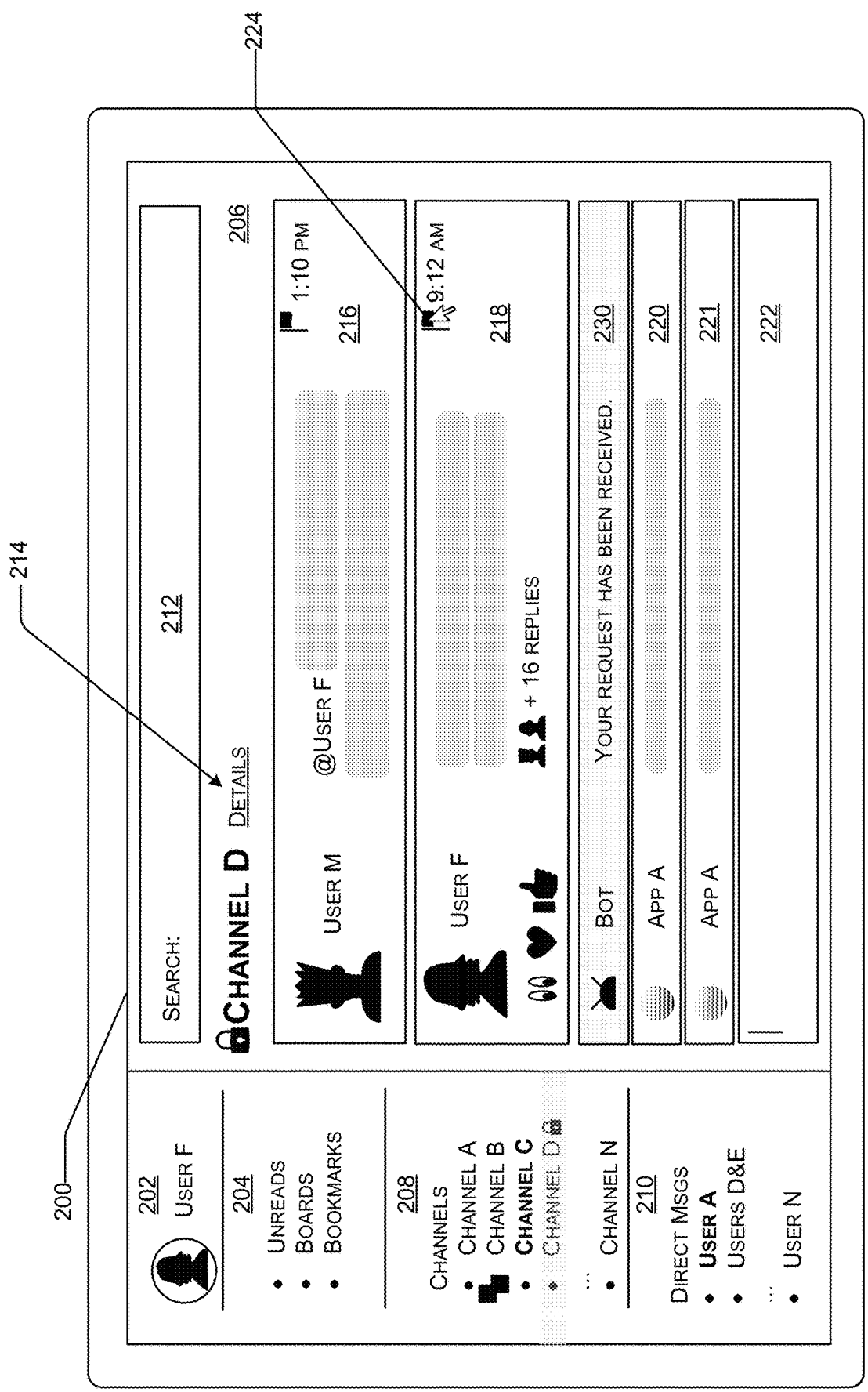
FIG. 2C illustrates another example of the user interface presented via the communication platform, as described herein, wherein a user interface element associated with a confirmation that a request for review has been received is presented via the user interface, as described herein.

In some examples, as illustrated in FIG. 2C, the object moderation component 116 can cause an object to be presented via the user interface 200 to confirm that the request to review the flagged message (e.g., represented by the user interface element 218) has been received. In some examples, such a message can be referred to as a "responsive message" or "confirmation message." As illustrated in FIG. 2C, a new user interface element 230 is presented via the user interface 200. The new user interface element 230 can be associated with the flagged message (e.g., represented by the user interface element 218) and can provide an indication that the request to review the flagged message has been received. In some examples, the new user interface element 230 can be presented in response to the object moderation component 116 receiving input via the user interface element 226.

In at least one example, in response to receiving the request (e.g., via actuation of the actuation mechanism associated with the user interface element 224) and/or input via the user interface element 226, the object moderation component 116 can route the flagged message to a reviewer, as described above. In an example where a flagged object is associated with a virtual space that is shared with multiple groups, the flagged object can be routed to a reviewer associated with the same group with which the flagging user is associated. That is, if a user associated with Organization A flags a message from a shared channel with Organization A and Organization B, the flagged message can be routed to a reviewer associated with Organization A and/or a review channel associated with Organization A, regardless of whether the message was posted by a user of Organization A or Organization B. In such an example, a reviewer associated with Organization A can consult with a reviewer associated with Organization B, if applicable, but reviewer(s) of Organization B may not be permissioned to initially receive the request to review the message as flagged by the user. That said, in some examples, a reviewer of Organization A may not be permissioned to perform an action with respect to the flagged message (posted by a user of Organization B). In some examples, a review channel can be a shared channel associated with multiple groups such that reviewers associated with the multiple groups can collectively review flagged objects associated with virtual spaces shared between the multiple groups.

Figure 3A:
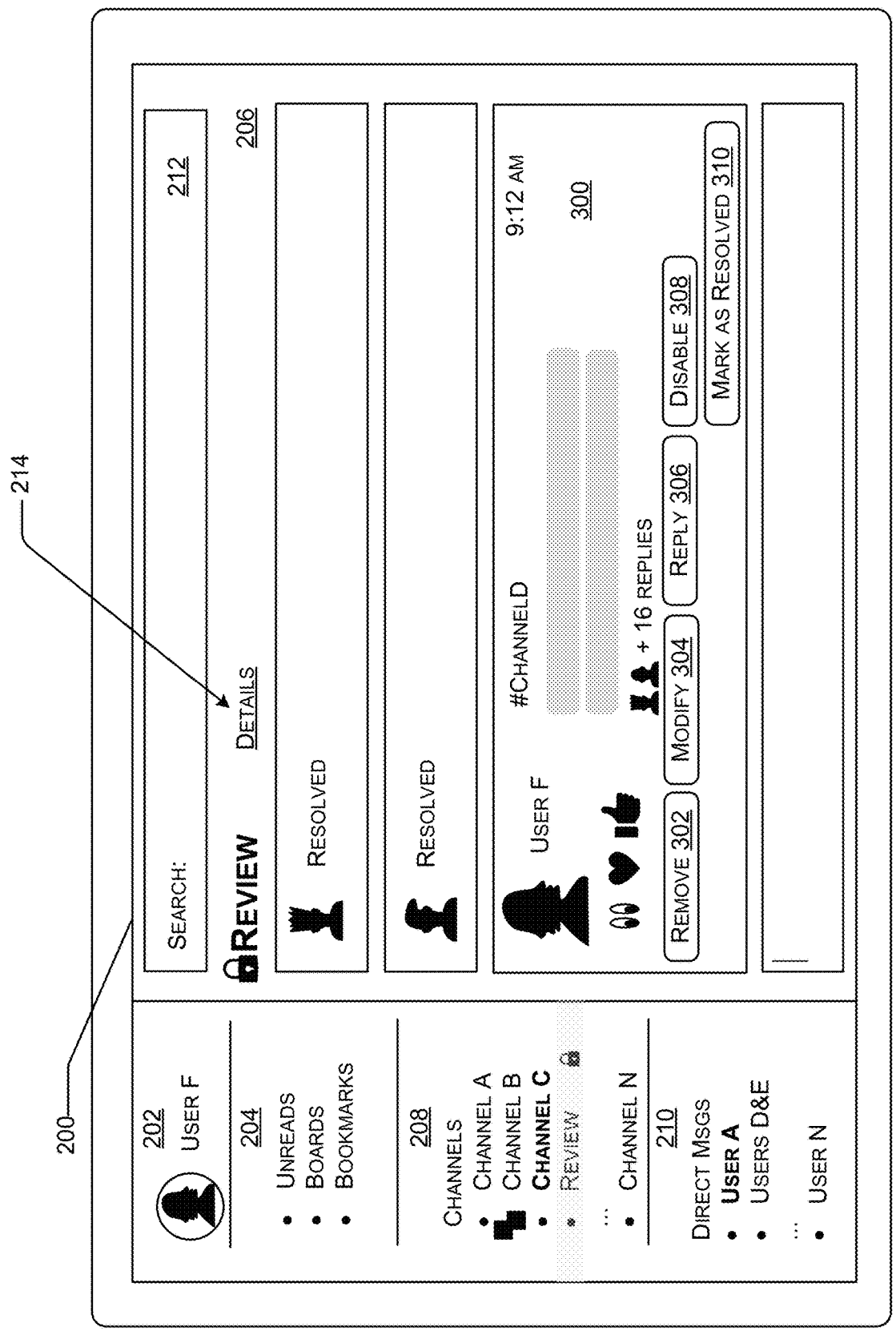
FIG. 3A illustrates another example of a user interface presented via a communication platform, as described herein, wherein a section of the user interface is configured to present one or more messages for review, as described herein.

FIG. 3A illustrates an example of a channel, presented via an instance the user interface 200, which enables a reviewer to review flagged objects. The user interface 200 in FIG. 3A is shown from a perspective of a client of a reviewer. As described above, in some examples, the object moderation component 116 can associate a flagged object with a channel for reviewing flagged objects. In at least one example, a "review channel" can be a private channel such that users who are not members of the review channel cannot access data associated with the review channel and/or cannot find the review channel (e.g., via a search or the like). In some examples, the review channel can be associated with one or more members who are permissioned to access objects associated with the review channel and/or perform actions associated with objects in the review channel. In some examples, the review channel can be accessible to users having particular user types and/or roles (e.g., administrator users, reviewers, etc.), such that users having such particular user types and/or roles can be members of the review channel. Additional or alternative members can be added to the review channel as members and can therefore be permissioned to review objects.

In at least one example, a flagged object can be "routed to" a review channel such that the flagged object is copied to the review channel. That is, the object moderation component 116 can duplicate a flagged object and associate the duplicated flagged object with the review channel. A user interface element 300, representative of the flagged message (e.g., from FIG. 2A), is illustrated in FIG. 3A. In at least one example, a flagged object, when presented via the review channel, can be unfurled in the review channel (e.g., a preview of any link associated with the object) for triage. In some examples, flagged objects can be associated with files, reactions, a subset of or entire threads, and/or the like when presented via the review channel. In some examples, a flagged object can be presented with additional or alternative context data. As illustrated in FIG. 3A, the user interface element 300 is associated with context data indicating which channel (e.g., Channel D) the flagged message originated in. In some examples, a reason or other information provided via a user interface element 226 (e.g., from FIG. 2B) can be associated with the user interface element 300 as context data.

In at least one example, reviewers can take appropriate actions on flagged objects from the review channel. In at least one example, the user interface element 300 representative of the flagged message (e.g., from FIG. 2A), presented via the user interface 200, can be associated with one or more affordances to enable a reviewer to perform one or more actions with respect to the flagged message. In some examples, the one or more affordances can be associated with user interface elements that are selectable, for example by actuation of an associated actuation mechanism, to perform an action. As described above, the one or more actions can include removing an object from a virtual space (e.g., via interaction with user interface element 302), modifying presentation of an object (e.g., via interaction with user interface element 304), replying to an object (e.g., via interaction with user interface element 306), disabling interaction with at least an object (e.g., via interaction with user interface element 308), etc. In some examples, the reviewer may moderate the message to remove text, an image, a file, or the like by clicking on the user interface element 304 (i.e., to modify the message) or the user interface element 306 (i.e., to provide a response to help guide the conversation). In some examples, an action can be "no action," such that if the reviewer determines that a message or other communication does not warrant another action, the reviewer can take no action and, in some examples, can indicate that the review is complete (e.g., via interaction with user interface element 310). In at least one example, interaction with the user interface element 310 can dismiss the review such that the object moderation component 116 can remove the user interface elements 302-310 from user interface element 300 and associate an indication with the flagged object that the review has been completed and/or the issue has been resolved.

While FIG. 3A is directed to a review channel, in some examples, flagged objects can be routed to a review center or hub from which permissioned users (e.g., reviewers) can review flagged messages and/or other communications as described herein.

Figure 3B:
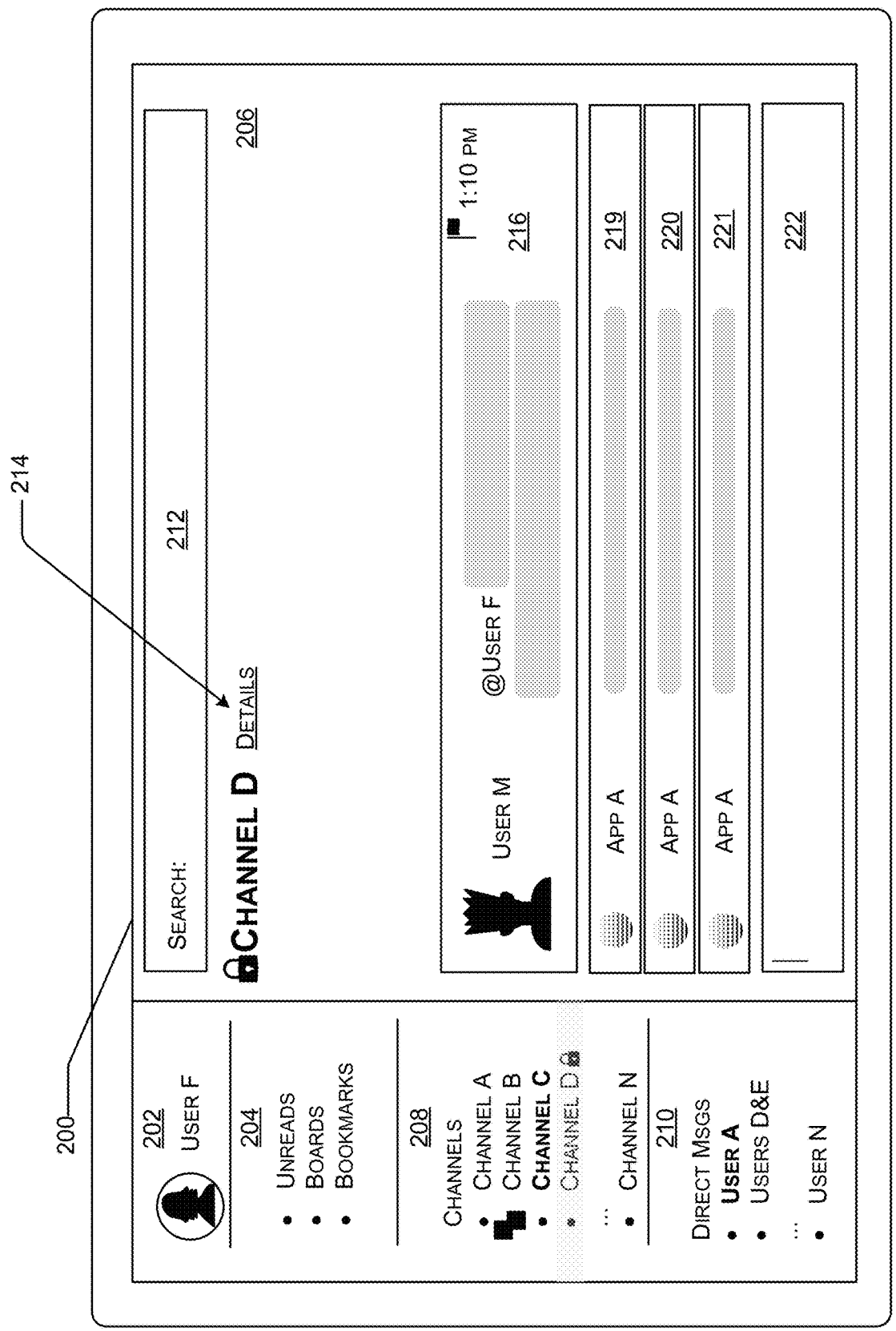
FIG. 3B illustrates an example of the user interface of FIG. 2A, wherein presentation of a message has been removed, as described herein.
Figure 3C:
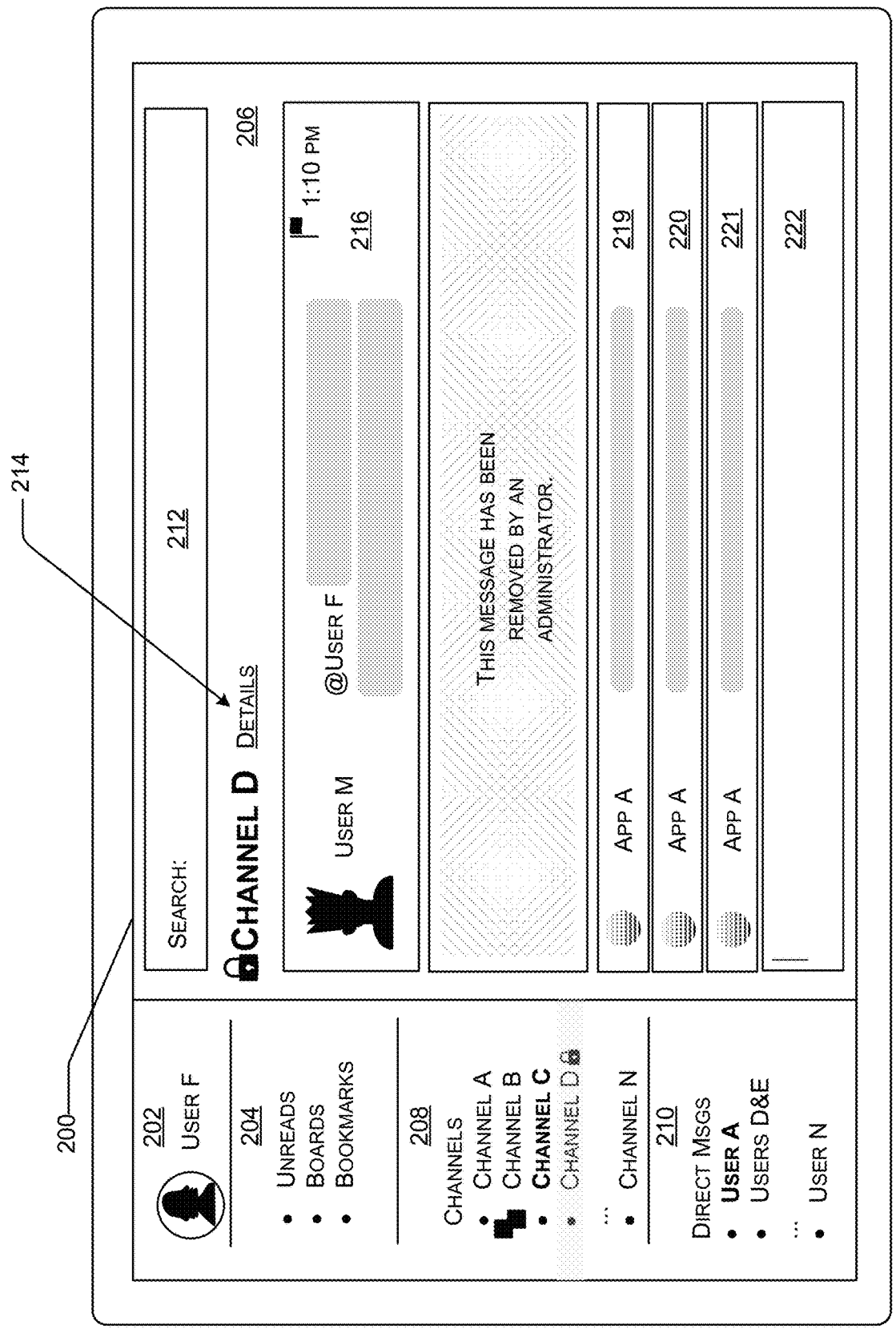
FIG. 3C illustrates an example of the user interface of FIG. 2A, wherein presentation of a message has been modified, as described herein.
Figure 3D:
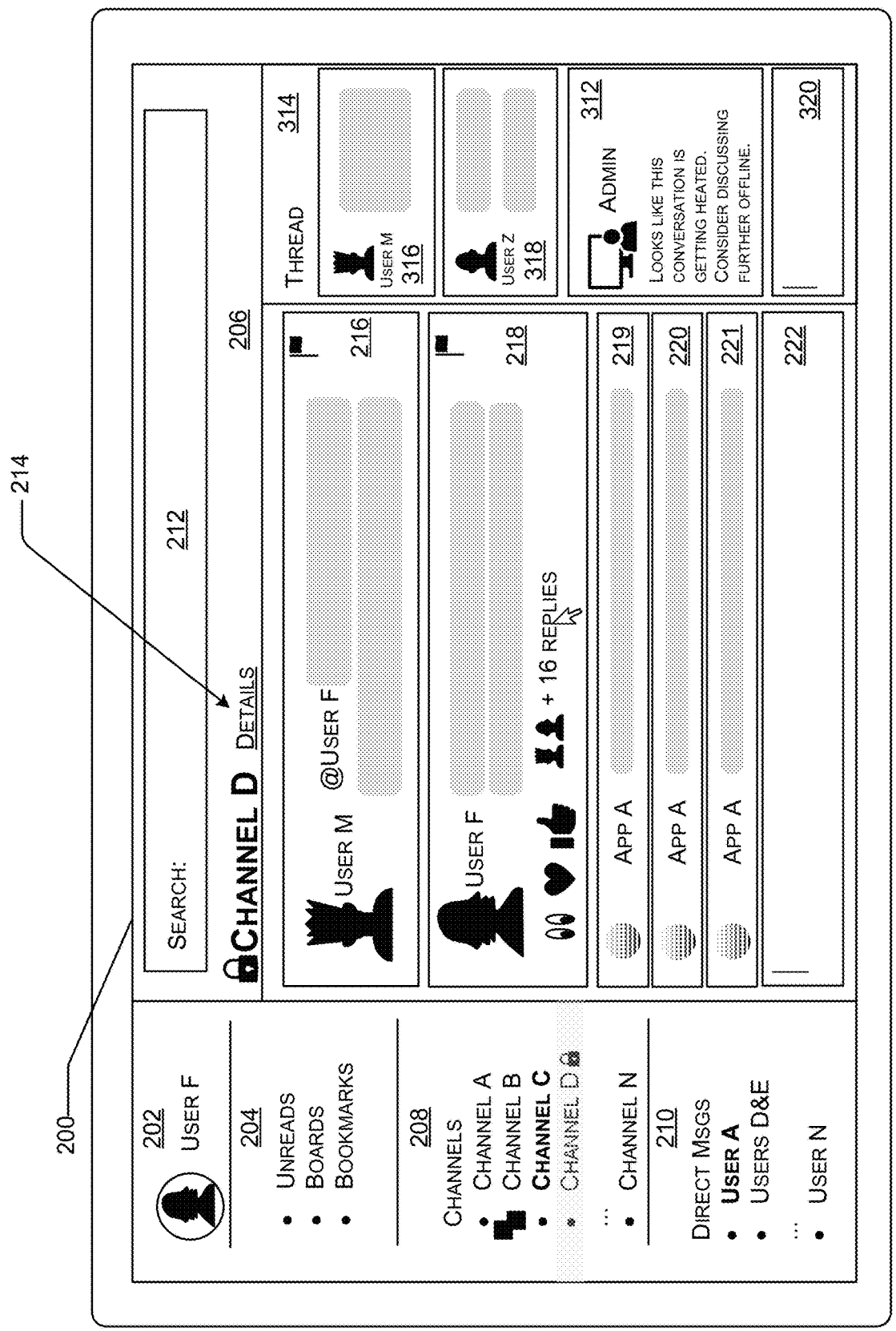
FIG. 3D illustrates an example of the user interface of FIG. 2A, wherein an administrator has replied to a message flagged for review, as described herein.
Figure 3E:
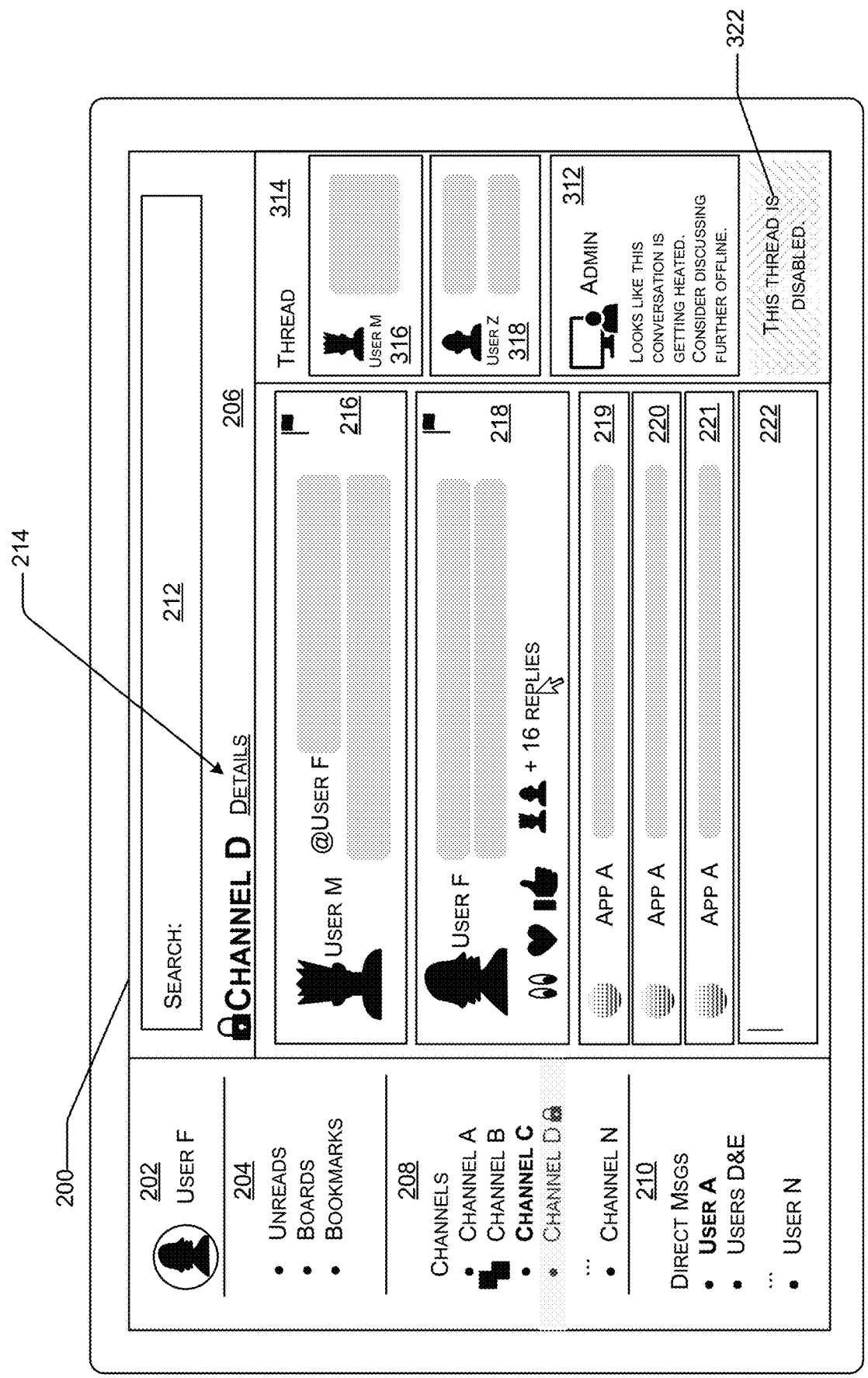
FIG. 3E illustrates an example of the user interface of FIG. 2A, wherein interaction with a message flagged for review has been disabled, as described herein.

FIGS. 3B-3E illustrate examples of the user interface 200 as presented via a client of a user after a reviewer requests a particular action to be performed and the particular action has been performed by the object moderator component 116. As described above, after the object moderator component 116 has performed and/or to effectuate performance of an action relative to a flagged object, the object moderator component 116 can send an indication of such to each client via which the flagged object is being presented or is otherwise associated. Such an indication can be an instruction to update the instance of the user interface presented via the respective client as it pertains to the flagged object. Additional details are provided below with reference to FIGS. 3B-3E. With reference to FIGS. 3B and 3E, the flagged object is a message (e.g., represented by the user interface element 218 of FIG. 2A); however, techniques described with reference to FIGS. 3B-3E can be applicable to any object associated with the communication platform, as described above.

FIG. 3B illustrates an example of the user interface 200, wherein presentation of a message has been removed. That is, based at least in part on detecting an interaction with the user interface element 302, the application 140 can send an indication of such to the object moderation component 116. The object moderation component 116 can receive the indication and can remove the flagged message from the user interface 200. In some examples, the message can still be stored in the datastore 122 but may not be rendered via the user interface 200. In some examples, a message may not be accessible by the user who posted the message after it has been removed.

FIG. 3C illustrates an example of the user interface 200, wherein presentation of a message has been modified. That is, based at least in part on detecting an interaction with the user interface element 304, the application 140 can send an indication of such to the object moderation component 116. The object moderation component 116 can receive the indication and can modify presentation of the message as presented via the user interface 200. That is, the message can be stored in the datastore 122, but the object moderation component 116 can cause contents of the message to be obfuscated when presented via the user interface 200. In some examples, portions of the message can be obfuscated. In other examples, the entire message can be obfuscated. In some examples, an obfuscated object can be associated with one or more user interface elements indicating that the object has been removed by an administrator or other permissioned user. In some examples, the user that posted the message may be able to edit or delete the flagged message. In some examples, after the presentation has been modified, the user may not be permitted to edit or delete the flagged message.

FIG. 3D illustrates an example of the user interface 200, wherein an administrator or other permissioned user has replied to a message flagged for review. That is, based at least in part on detecting an interaction with the user interface element 308, the application 140 can send an indication of such to the object moderation component 116. The object moderation component 116 can receive the indication of the interaction. In some examples, the object moderation component 116 can present a user interface element associated with a composition user interface to enable the reviewer to compose a reply to the flagged message. In some examples, the reply can recommend an alternative virtual space to continue the conversation, recommend an in-person meeting to further discuss the subject matter of the message, etc. In some examples, the reply can indicate that the flagged message violates a policy. In some examples, the reply can suggest the user edit or reconsider the content associated with the flagged message. In at least one example, the reply can include a link to another virtual space, a meeting, a document, etc. In at least one example, the reply, when presented via the user interface 200, can be associated with an indication that the reply is from a user type (e.g., an administrator user) or a user role (e.g., a reviewer) instead of indicating that the reply is from a particular user. This can enable administrator users to operate somewhat anonymously. In some examples, reply messages and/or other objects can be associated with presentation characteristics that visually differentiate such messages from other messages and/or communication objects. For example, a reply message can be presented with a different color, different font, different configuration, etc. than other messages and/or communication objects to denote the source.

In at least one example, a user interface element 312 representative of the reply can be presented via the user interface 200. In at least one example, the user interface element 312 can be associated with a thread of one or more messages associated with the flagged message. As illustrated in FIG. 3D, the second section 206 of the user interface 200 is updated to include a new sub-section 314 associated with the thread. In at least one example, the sub-section 314 can include one or more user interface elements 316, 318 representative of one or more messages associated with the thread. In at least one example, the user interface element 312 representative of the reply can be presented via the sub-section 314. In some examples, the sub-section 314 can include an input mechanism 320 to enable the user to generate a new message to be associated with the thread.

In some examples, a reply can be posted in the channel, direct message, board, etc. with which a flagged object is associated. That is, in some examples, a reply may not be posted in association with a thread but may be posted directly to the channel, direct message, board, etc.

FIG. 3E illustrates an example of the user interface 200, wherein interaction with a message flagged for review has been disabled. That is, based at least in part on detecting an interaction with the user interface element 310, the application 140 can send an indication of such to the object moderation component 116. The object moderation component 116 can receive the indication of the interaction. In some examples, the object moderation component 116 can disable interaction with the flagged message. That is, the object moderation component 116 can disable the ability of users to react to the flagged message (e.g., via emoji or reactji), disable the ability of users to comment or reply to the flagged message, disable the ability of users to edit or delete the flagged message, share the flagged message, save the flagged message, and/or the like. In at least one example, interactions can be disabled temporarily, for example, for a period of time, or until an occurrence of an event. In at least one example, after expiration of the period of time, the occurrence of the event, and/or the like, the object moderation component 116 can enable interactions such that users can again react to an object, reply to an object, and/or the like.

In some examples, if a message is part of a thread, interaction with the entire thread can be disabled, as illustrated in FIG. 3E. That is, as illustrated in FIG. 3E, the input mechanism 320 is obfuscated and a user interface element 322 indicates that the thread has been disabled. Further, other interaction affordances (e.g., emoji or reactji affordances) can be removed or disabled for messages that are part of the thread. In examples where a message is associated with a thread, interaction with a message and one or more thread messages can be disabled without disabling the channel or other virtual space with which the message is associated. That is, the object moderation component 116 can disable interaction with an object of a channel, direct message, board, and/or the like without disabling interaction with other objects associated therewith. This is an improvement over existing techniques.

In some examples, a channel or direct message, or a portion thereof, can be temporarily disabled based at least in part on an object that is posted to the channel or direct message being flagged for review. That is, in some examples, interaction for each message in a channel or direct message can be disabled, at least temporarily, which can disable the ability of users to react to each object in the channel or direct message (e.g., via emoji or reactji), disable the ability of users reply to each object in the channel or direct message, disable the ability of users to edit or delete individual of the objects in the channel or direct message, share individual of the objects in the channel or direct message, save individual of the objects in the channel or direct message, and/or the like. In some examples, if a portion of a channel or direct message is disabled, each object associated with the portion can be disabled as described above. Further, in such examples, an input mechanism can be disabled to disable the ability of users to post new objects to the channel or direct message.

In at least one example, the object moderation component 116 can send an indication to each client associated with the disabled thread, channel, direct message, etc., to indicate that the thread, channel, direct message, etc. is disabled. In some examples, objects that have been drafted but not yet posted when a thread, channel, direct message, etc. is disabled can be saved as a draft in association with an account of the drafting user. That is, in at least one example, the object moderation component 116 can receive an indication of a message to be posted to a disabled thread and, based at least in part on determining that the thread is disabled, can save the message as a draft and send an indication of such to the client of from which the message was received. In some examples, the object moderation component 116 can cause an error to be presented to a user who attempts to post an object in a disabled thread, channel, direct message, etc. That is, in at least one example, the object moderation component 116 can receive an indication of a message to be posted to a disabled thread and, based at least in part on determining that the thread is disabled, can send an error message or the like to the client of from which the message was received. In some examples, such an error message can indicate that the thread is disabled.

In some examples, one or more user interface elements can be presented via a disabled thread, channel, direct message, and/or the like to communicate to users that the thread, channel, direct message, and/or the like has been disabled. Further, in some examples, indications of threads, channels, direct messages, etc., as stored in the datastore 122, can be associated with indicators of whether such threads, channels, direct messages, etc. are disabled (or not). That is, in some examples, a disabled state can be associated with indications of disabled threads, disabled channels, disabled direct messages, etc. In some examples, even though a thread, channel, or direct message is disabled, some users (e.g., administrator users or other permissioned users) can post to the thread, channel, direct message, etc.

It should be noted that while techniques described herein are described in the context that an action can be performed on a flagged object, in some examples, one or more actions can be performed without an object first being flagged. That is, a thread can be disabled without an associated message first being flagged. Or, a message can be obfuscated without the message first being flagged.

In some examples, more than one action can be performed on a flagged object. For example, a reply can be sent prior to a flagged object being disabled. Or, a reply can be sent prior to a flagged object being removed. In some examples, a flagged object can be associated with an unresolved state until the object moderation component 116 receives an indication that review is complete. That is, in some examples, a state of a flagged object can be updated from unresolved to resolved based at least in part on receiving such an indication. In some examples, individual of the actions can trigger such an indication to be received by the object moderation component 116. In some examples, a reviewer can interact with a user interface to provide an input indicating that the review is complete.

Figure 4:
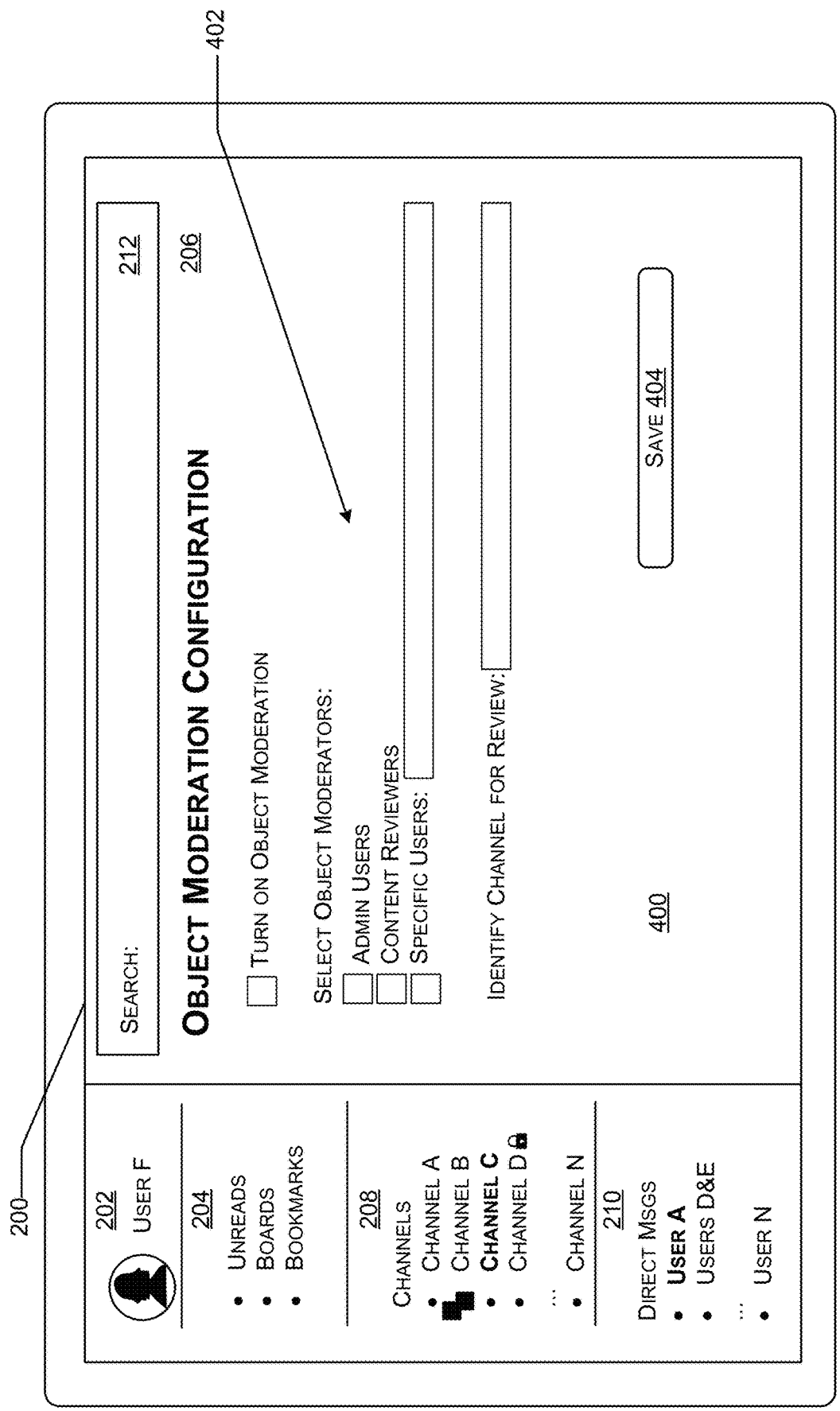
FIG. 4 illustrates another example of a user interface presented via a communication platform, as described herein, wherein the user interface is configured for configuring message moderation settings, as described herein.

In some examples, object moderation can be a default configuration for users of the communication platform. In some examples, object moderation can be configured by an administrator user, for example, via a configuration user interface 400 illustrated in FIG. 4. In at least one example, the configuration user interface 400 can be presented via the second section 206 of the user interface 200. In some examples, the configuration user interface 400 can be presented via a pop-up, overlay, a new user interface, and/or the like.

In at least one example, the configuration user interface 400 can include one or more user interface elements 402, which can enable an administrator user to turn on object moderation and thus enable flagging and/or review of objects, such as messages and/or other communication objects. In at least one example, when object moderation is "on" or otherwise enabled, object moderation and/or other content review can be enabled in settings associated with a group (e.g., workspace, organization, etc.) and/or virtual space (e.g., channel, direct message, board, etc.). When object moderation and/or other content review is enabled, permissioned users can flag, or otherwise report, objects for review in the user interface 200. In at least one example, when object moderation and/or other content review is enabled, flagged objects can be routed to a review channel, as described above.

In at least one example, the user interface elements 402 can enable designation of which user(s) can moderate objects (e.g., administrator users, content reviewers, specific users, etc.). That is, at least some of the user interface elements 402 can enable an administrator user to designate user type(s) and/or role(s), or particular user(s), for reviewing flagged objects. User(s) identified via the configuration user interface 400 can be "permissioned user(s)" or "reviewer(s)" having been permissioned to review flagged objects. In some examples, user(s) identified via the configuration user interface 400 can be associated with permissions such that they are (i) added as member(s) to the review channel and (ii) can see flagged objects in the review channel. In some examples, user(s) identified via the configuration user interface 400 can be associated with permissions enabling them to receive notifications or otherwise be made aware of objects that have been flagged for review. As described above, permissioned reviewers can review contents of objects and perform one or more actions associated with such objects, if appropriate.

In at least one example, the user interface elements 402 can enable an administrator user to identify a channel with which flagged objects are to be routed for review. If the channel identified does not already exist, a new channel, designated for review purposes, can be created. As such, flagged objects can be routed to such a channel. As described above, in some examples, the identified channel can be a private channel. In some examples, the identified channel can be an organization-wide channel. In some examples, the identified channel can be associated with one or more members who are permissioned to review flagged objects and perform one or more remedial actions associated therewith.

In at least one example, the configuration user interface 400 can include a user interface element 404 that can be associated with an actuation mechanism. When actuated, data input via the configuration user interface 400 can be saved as settings associated with a group, virtual space, etc. In some examples, configurations for object moderation can be set at the group level (e.g., workspace, organization, etc.), virtual space level, or the like. That is, relevant administrator users—or other users—can designate permissions associated with object moderation to particular virtual spaces, groups, and/or the like.

FIGS. 1-4 make reference to "user interface elements." A user interface element can be any element of the user interface that is representative of an object, message, virtual space, and/or the like. A user interface element can be a text element, a graphical element, a picture, a logo, a symbol, and/or the like. In some examples, a user interface element can be presented as a pop-up, overlay, new sections of the user interface 200, a new user interface, part of another user interface element, and/or the like. In at least one example, individual of the user interface elements can be associated with actuation mechanisms. Such actuation mechanisms can make the corresponding user interface elements selectable. That is, actuation of an actuation mechanism as described herein can, in some examples, indicate a selection of a corresponding user interface element. In at least one example, the application 140 can receive an indication of an interaction with a user interface element (e.g., indication of a selection and/or actuation of an actuation mechanism) and can send an indication of such to the server(s) 102. In some examples, the server(s) 102 can send data and/or instructions to the application 140 to generate new user interfaces and/or update the user interface 200, as described herein.

The example user interfaces and user interface elements described above are provided for illustrative purposes. In some examples, such user interfaces and user interface elements can include additional or alternative data, which can be presented in additional or alternative configurations. That is, the user interfaces and user interface elements should not be construed as limiting.

FIGS. 5-10 are flowcharts showing example processes involving techniques as described herein. The processes illustrated in FIGS. 5-10 are described with reference to components of the environment 100 shown in FIG. 1 for convenience and ease of understanding. However, the processes illustrated in FIGS. 5-10 are not limited to being performed using the components described above with reference to the environment 100. Moreover, the components described above with reference to the environment 100 are not limited to performing the processes illustrated in FIGS. 5-10.

The processes in FIGS. 5-10 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 5-10 can be combined in whole or in part with each other or with other processes.

Figure 5:
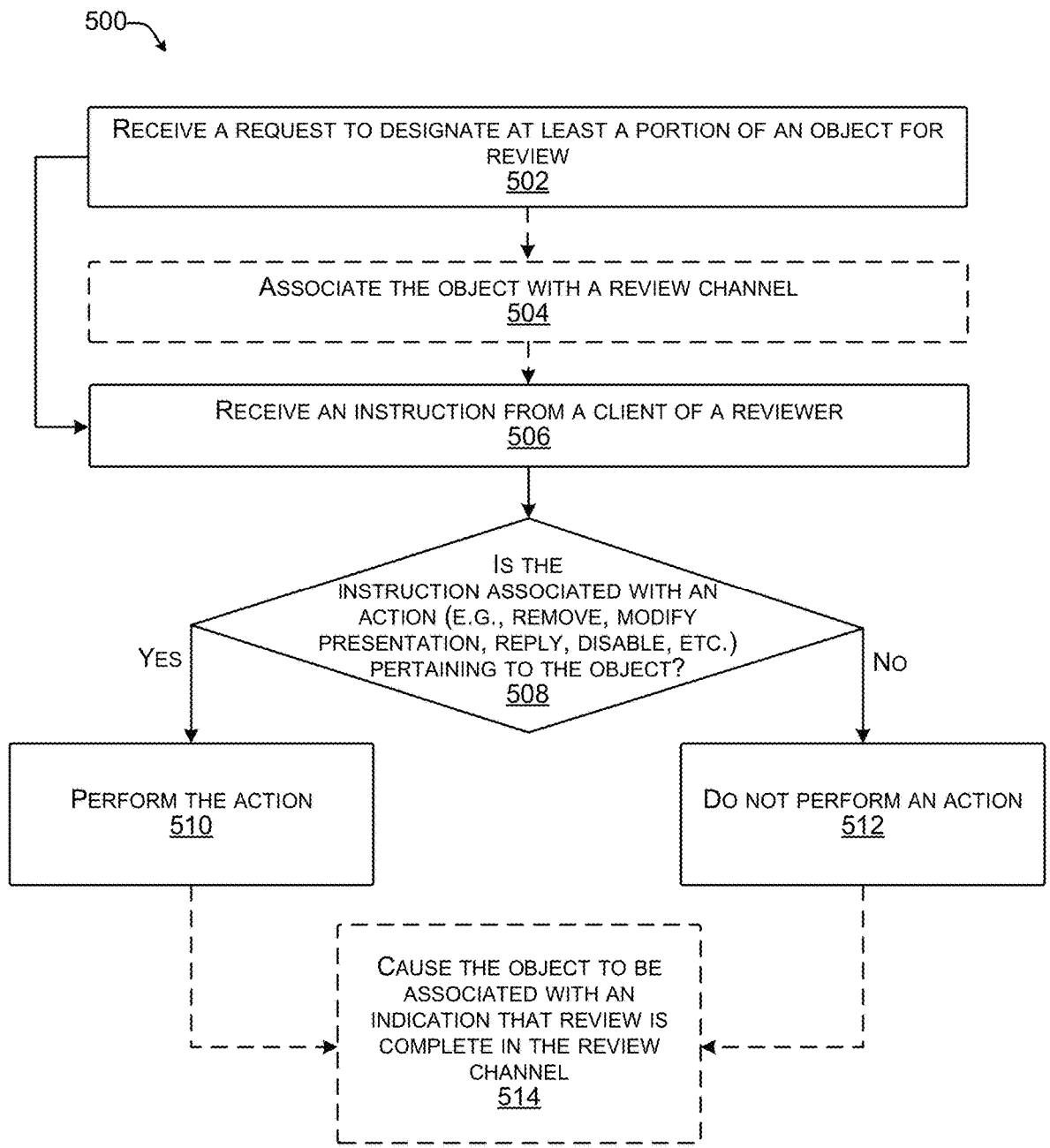
FIG. 5 illustrates an example process for moderating objects based at least in part on receiving requests to review such objects, as described herein.

FIG. 5 illustrates an example process 500 for moderating objects (e.g., objects) based at least in part on receiving requests to review such objects, as described herein.

At operation 502, the object moderation component 116 can receive a request to designate at least a portion of an object for review. As described above, in at least one example, the object moderation component 116 can associate affordances with user interface elements representative of objects. In some examples, such an affordance can be a user interface element that is interactable to enable a user to trigger a review process in association with an object. In some examples, an affordance can be a particular user interface element associated with an actuation mechanism. In such examples, actuation of the actuation mechanism can trigger a review process. In some examples, an affordance can be associated with a user interface element that is associated with an actuation mechanism that, when actuated, can cause one or more actions to be presented via a user interface. Such action(s) can include flagging an object for review, editing an object, deleting an object, pinning an object, etc. In at least one example, a user can select an action associated with flagging a message to trigger the review process. In at least one example, interaction with the affordance can generate a request that can be sent to the server(s) 102 and received by the object moderation component 116. The request can identify an object and can include an indication that the object has been flagged for review. Such objects can be referred to herein as "flagged" objects. In some examples, a portion of an object can be flagged for review. For example, a file, an image, a video, or other object associated with an object can be flagged for review.

At operation 504, which can be optional, the object moderation component 116 can associate the object with a review channel. In some examples, the object moderation component 116 can associate a flagged object with a channel for reviewing flagged objects. In at least one example, a "review channel" can be a private channel such that users who are not members of the review channel cannot access data associated with the review channel and/or cannot find the review channel (e.g., via a search or the like). In some examples, the review channel can be associated with one or more members who are permissioned to access data associated with the review channel and/or perform actions associated with data in the review channel. In some examples, the review channel can be accessible to users having particular user types and/or roles (e.g., administrator users, reviewers, etc.), such that users having such particular user types and/or roles can be members of the review channel.

In at least one example, a flagged object can be "routed to" a review channel such that the flagged object is copied to the review channel. That is, the object moderation component 116 can duplicate a flagged object and associate the duplicated flagged object with the review channel. In some examples, the flagged object can be presented with context data. For example, the flagged object can be presented with an indication of the virtual space (e.g., channel, direct message, board, etc.) the flagged object is associated with, a sender or originator of the flagged object, interactions with the flagged object, and/or the like. In at least one example, a user interface element representative of the flagged object, presented via a user interface as described below, can be associated with one or more affordances to enable a reviewer to perform one or more actions with respect to the flagged object. As described above, the one or more actions can include removing an object from a virtual space, modifying presentation of an object (e.g., obfuscating at least a portion of the object), replying to an object, disabling interaction with at least an object (e.g., disabling reactions, replies, editing, deleting, sharing, etc.), etc.

In at least one example, the object moderation component 116 can send an object that has been flagged for review directly to a client of a reviewer. In at least one example, a reviewer can receive a notification associated with an object that has been flagged for review. Such a notification can include a link to the object and/or another mechanism for reviewing the object.

As described above, in at least one example, in response to receiving a request to review an object, the object moderation component 116 can determine whether a user who flagged the object has permission to do so. In some examples, such a check can determine whether the flagging user has permission to view the object (e.g., based on group membership, channel membership, etc.). In at least one example, based at least in part on determining that the user is permissioned to flag the object for review, the object moderation component 116 can initiate a review process as described herein by routing the flagged object to a reviewer (e.g., directly or via association with a review channel).

At operation 506, the object moderation component 116 can receive an instruction from a client of a reviewer. In some examples, such an instruction can be received in response to an interaction with an affordance presented via the user interface. That is, an input associated with an affordance to remove an object, modify presentation of an object, reply to an object, disable interaction with an object, and/or the like can be detected by the application 140 and an indication associated with such an input can be sent to the object moderation component 116.

At operation 508, the object moderation component 116 can determine whether the instruction is associated with an action (e.g., remove, modify presentation, reply, disable, etc.) pertaining to the object. In some examples, the instruction may be associated with an action, for example, to remove an object, modify presentation of an object, reply to an object, disable interaction with an object, and/or the like. In some examples, the instruction may indicate that the flagged object has been reviewed and no action is warranted.

At operation 510, based at least in part on determining that the instruction is associated with an action (i.e., "yes" at operation 508), the object moderation component 116 can perform the action. In at least one example, in response to receiving an instruction associated with an action to be performed in association with an object, the object moderation component 116 can perform the action. In some examples, the object moderation component 116 can "perform" the action by sending an instruction to each client via which which the object is presented to perform the action (e.g., remove the object, or portion thereof, from presentation, modify presentation of the object, or portion thereof, etc.). In some examples, the object moderation component 116 can "perform" the action by, for example, modifying a state of an object (e.g., enabled to disabled) and can send an indication associated therewith to each client via which which the object is presented (e.g., via an event notification or a real-time event notification). In some examples, the object moderation component 116 can "perform" the action by, for example, causing a composition user interface to be presented via a client of the reviewer to enable the reviewer to compose a reply, and can send the reply to each client via which which the object is presented (e.g., via an event notification or a real-time event notification). In some examples, an action can be "no action," such that if the reviewer determines that a message or other communication does not warrant an action and/or has otherwise been resolved, the reviewer can take no action and, in some examples, can indicate that the review is complete. Additional details associated with actions that can be taken with respect to a flagged object are described below with reference to FIGS. 6-9.

At operation 512, the object moderation component 116 can refrain from performing an action.

At operation 514, which can be optional (e.g., when a flagged object is associated with a review channel), the object moderation component 116 cause the object to be associated with an indication that review is complete in the review channel. In at least one example, whether the instruction is associated with an action (i.e., "yes" at operation 508) and the action has been performed or the instruction is not associated with an action (i.e., "no" at operation 508), the object moderation component 116 can remove affordance(s) from a user interface element representative of the object and, in some examples, associate an indication with a user interface element representative of the flagged object in the review channel to indicate that the review has been completed and/or the issue has been resolved.

Figure 6:
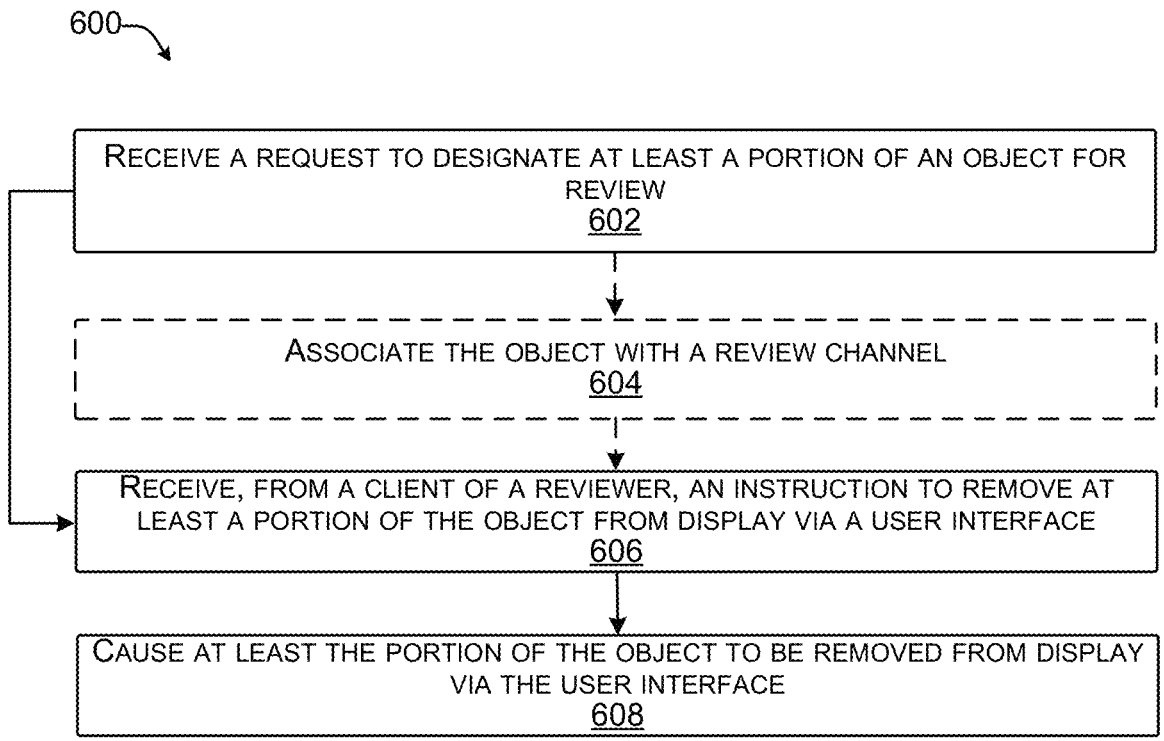
FIG. 6 illustrates an example process for causing at least a portion of an object to be removed from display via a user interface, as described herein.

FIG. 6 illustrates an example process 600 for causing at least a portion of an object to be removed from display via a user interface, as described herein.

At operation 602, the object moderation component 116 can receive a request to designate at least a portion of an object for review, as described above with reference to operation 502 of FIG. 5.

At operation 604, which can be optional, the object moderation component 116 can associate the object with a review channel, as described above with reference to operation 504 of FIG. 5.

At operation 606, the object moderation component 116 can receive, from a client of a reviewer, an instruction to remove at least a portion of the object from display via a user interface. In at least one example, a reviewer can interact with an affordance in a user interface associated with the communication platform, wherein the affordance is associated with removing an object, such as an object, from presentation via the user interface. In at least one example, such an interaction can be detected by the application 140 and an indication of such can be sent to the server(s) 102. The object moderation component 116 can receive the indication of such. In some examples, the indication can be associated with an instruction to remove the object from presentation via the user interface.

At operation 608, the object moderation component 116 can cause at least a portion of the object to be removed from display via the user interface. In at least one example, the object moderation component 116 can send an instruction to one or more clients to update respective instances of the user interface to remove at least the portion of the object from display. As illustrated above with reference to FIG. 3B, the object moderation component 116 can remove the flagged object from the user interface associated with the communication platform (e.g., user interface 200). In some examples, the object can still be stored in the datastore 122 but may not be rendered via the user interface. In some examples, the object may not be accessible by the user who posted the object after it has been removed.

Figure 7:
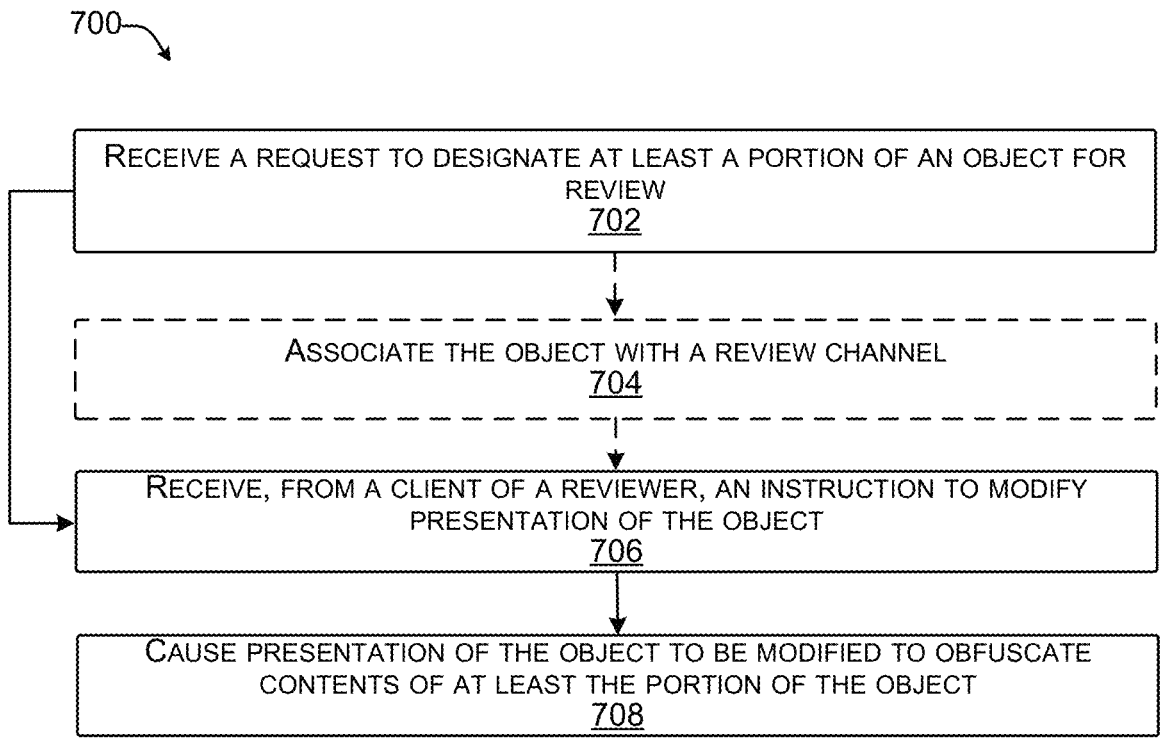
FIG. 7 illustrates an example process for modifying presentation of an object flagged for review, as described herein.

FIG. 7 illustrates an example process 700 for modifying presentation of an object flagged for review, as described herein.

At operation 702, the object moderation component 116 can receive a request to designate at least a portion of an object for review, as described above with reference to operation 502 of FIG. 5.

At operation 704, which can be optional, the object moderation component 116 can associate the object with a review channel, as described above with reference to operation 504 of FIG. 5.

At operation 706, the object moderation component 116 can receive, from a client of a reviewer, an instruction to modify presentation of the object. In at least one example, a reviewer can interact with an affordance in a user interface associated with the communication platform, wherein the affordance is associated with modifying presentation of an object. In at least one example, such an interaction can be detected by the application 140 and an indication of such can be sent to the server(s) 102. The object moderation component 116 can receive the indication of such. In some examples, the indication can be associated with an instruction to modify presentation of the object.

At operation 708, the object moderation component 116 can cause presentation of the object to be modified to obfuscate contents of at least the portion of the object. In at least one example, the object moderation component 116 can send an instruction to one or more clients to update respective instances of the user interface to modify presentation of the object. In some examples, the instruction can cause at least the portion of the object to be obfuscated. As illustrated above with reference to FIG. 3C, the object moderation component 116 can modify presentation of the object as presented via the user interface associated with the communication platform (e.g., user interface 200). That is, the object can be stored in the datastore 122, but the object moderation component 116 can cause contents of the object to be obfuscated when presented via the user interface. In some examples, portions of the object can be obfuscated. In other examples, the entire object can be obfuscated. In some examples, an obfuscated object or other communication object can be associated with one or more user interface elements indicating that the object or other communication object has been removed by an administrator or other permissioned user. In some examples, the user that posted the object may be able to edit or delete the flagged object.

In some examples, after the presentation has been modified, the user may not be permitted to edit or delete the flagged object.

Figure 8:
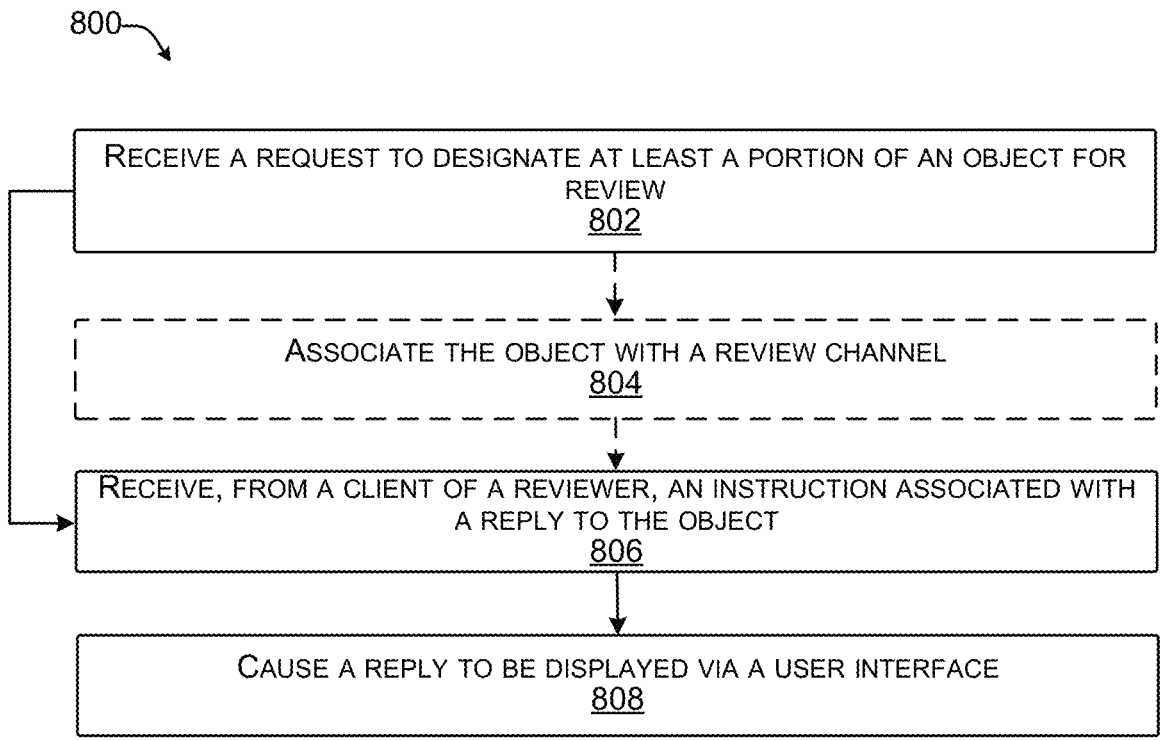
FIG. 8 illustrates an example process for replying to an object flagged for review, as described herein.

FIG. 8 illustrates an example process 800 for replying to an object flagged for review, as described herein.

At operation 802, the object moderation component 116 can receive a request to designate at least a portion of an object for review, as described above with reference to operation 502 of FIG. 5.

At operation 804, which can be optional, the object moderation component 116 can associate the object with a review channel, as described above with reference to operation 504 of FIG. 5.

At operation 806, the object moderation component 116 can receive, from a client of a reviewer, an instruction associated with a reply to the object. In at least one example, a reviewer can interact with an affordance in a user interface associated with the communication platform, wherein the affordance is associated with replying to an object, such as an object. In at least one example, such an interaction can be detected by the application 140 and an indication of such can be sent to the server(s) 102. The object moderation component 116 can receive the indication of such. In some examples, the indication can be associated with an instruction to reply to the object from presentation via the user interface.

At operation 808, the object moderation component 116 can cause a reply to be displayed via a user interface. As illustrated in FIG. 3D, the object moderation component 116 can cause a user interface element associated with a composition user interface, to enable the reviewer to compose a reply to the flagged object, to be presented via a user interface of the communication platform. In some examples, the reply can recommend an alternative virtual space to continue the conversation, recommend an in-person meeting to further discuss the subject matter of the message, etc. In some examples, the reply can indicate that the flagged object violates a policy. In some examples, the reply can suggest the user edit or reconsider the content associated with the flagged object. In at least one example, the reply can include a link to another virtual space, a meeting, a document, etc. In at least one example, the reply, when presented via a user interface, can be associated with an indication that the reply is from a user type (e.g., an administrator user) or a user role (e.g., a reviewer) instead of indicating that the reply is from a particular user. This can enable administrator users to operate somewhat anonymously. In some examples, reply messages and/or other objects can be associated with presentation characteristics that visually differentiate such messages from other messages and/or communication objects. For example, a reply message can be presented with a different color, different font, different configuration, etc. than other messages and/or communication objects to denote the source.

In some examples, a reply can be posted as a thread message associated with the flagged object. In some examples, a reply can be posted in the channel, direct message, board, etc. with which a flagged object is associated. That is, in some examples, a reply may not be posted in association with a thread but may be posted directly to the channel, direct message, board, etc.

Figure 9:
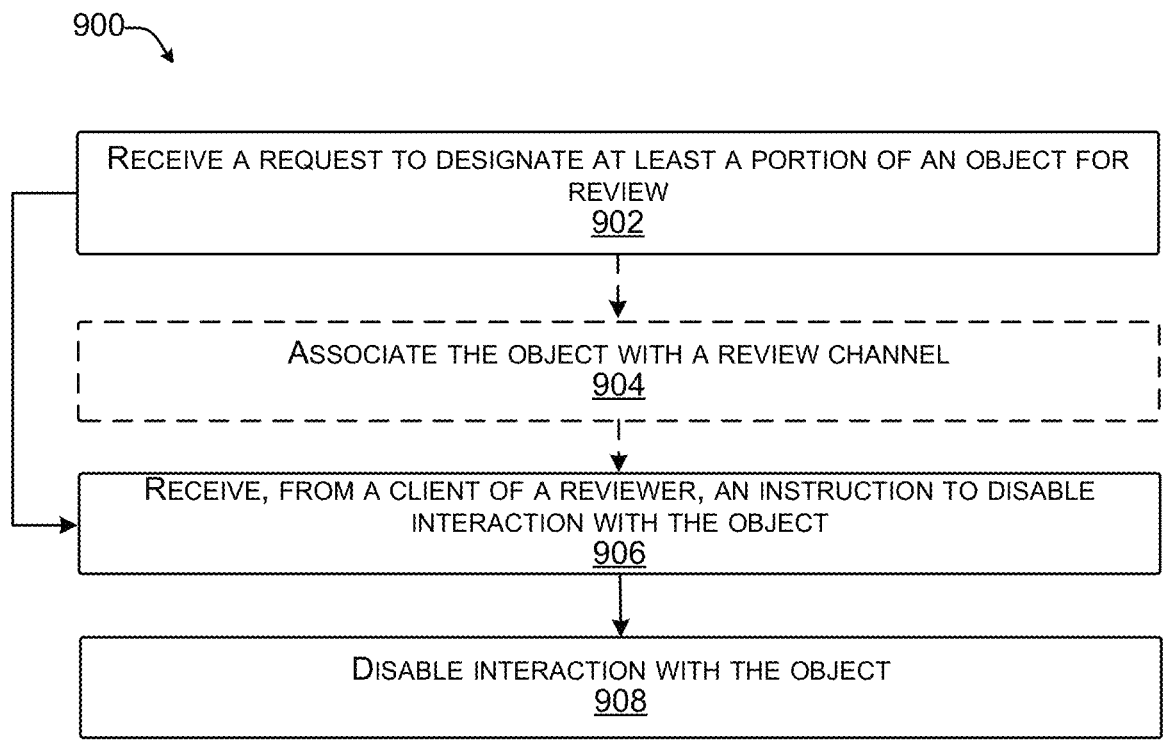
FIG. 9 illustrates an example process for disabling interaction with an object flagged for review, as described herein.

FIG. 9 illustrates an example process 900 for disabling interaction with an object flagged for review, as described herein.

At operation 902, the object moderation component 116 can receive a request to designate at least a portion of an object for review, as described above with reference to operation 502 of FIG. 5.

At operation 904, which can be optional, the object moderation component 116 can associate the object with a review channel, as described above with reference to operation 504 of FIG. 5.

At operation 906, the object moderation component 116 can receive, from a client of a reviewer, an instruction to disable interaction with the object. In at least one example, a reviewer can interact with an affordance in a user interface associated with the communication platform, wherein the affordance is associated with disabling interaction associated with an object, such as an object. In at least one example, such an interaction can be detected by the application 140 and an indication of such can be sent to the server(s) 102. The object moderation component 116 can receive the indication of such. In some examples, the indication can be associated with an instruction to disable interaction associated with the object from presentation via the user interface.

At operation 908, the object moderation component 116 can disable interaction with the object. In at least one example, the object moderation component 116 can send an instruction to one or more clients to disable interaction with the flagged object. In some examples, such an instruction can cause affordances to be removed from presentation via the user interface and/or can cause affordances to be grayed out or otherwise visually represented as disabled. As illustrated above with reference to FIG. 3E, the object moderation component 116 can disable interaction with the flagged object. That is, the object moderation component 116 can disable the ability of users to react to the flagged object (e.g., via emoji or reactji), disable the ability of users to comment or reply to the flagged object, disable the ability of users to edit or delete the flagged object, share the flagged object, save the flagged object, and/or the like. In at least one example, interactions can be disabled temporarily, for example, for a period of time, or until an occurrence of an event. In at least one example, after expiration of the period of time, the occurrence of the event, and/or the like, the object moderation component 116 can enable interactions such that users can again react to an object, reply to an object, and/or the like.

In some examples, if an object is part of a thread, interaction with the entire thread can be disabled. In some examples, an input mechanism can be obfuscated and a user interface element can indicate that the thread has been disabled. Further, other interaction affordances (e.g., emoji or reactji affordances) can be removed or disabled for objects that are part of the thread. In examples where an object is associated with a thread, interaction with an object and one or more thread objects can be disabled without disabling the channel or other virtual space with which the object is associated. That is, the object moderation component 116 can disable interaction with an object of a channel, direct object, board, and/or the like without disabling interaction with other objects associated therewith. This is an improvement over existing techniques.

In some examples, a channel or direct message, or a portion thereof, can be temporarily disabled based at least in part on an object that is posted to the channel or direct message being flagged for review. That is, in some examples, interaction for each object in a channel or direct message can be disabled, at least temporarily, which can disable the ability of users to react to each object or other communication object in the channel or direct message (e.g., via emoji or reactji), disable the ability of users reply to each object or other communication object in the channel or direct message, disable the ability of users to edit or delete individual of the objects or other communication objects in the channel or direct message, share individual of the objects or other communication objects in the channel or direct message, save individual of the objects or other communication objects in the channel or direct message, and/or the like. In some examples, if a portion of a channel or direct message is disabled, each object or other communication object associated with the portion can be disabled as described above. Further, in such examples, an input mechanism can be disabled to disable the ability of users to post new objects or other communication objects to the channel or direct message.

In at least one example, the object moderation component 116 can send an indication to each client associated with the disabled thread, channel, direct message, etc., to indicate that the thread, channel, direct message, etc. is disabled. In some examples, objects or other communication objects that have been drafted but not yet posted when a thread, channel, direct message, etc. is disabled can be saved as a draft in association with an account of the drafting user. That is, in at least one example, the object moderation component 116 can receive an indication of an object to be posted to a disabled thread and, based at least in part on determining that the thread is disabled, can save the object as a draft and send an indication of such to the client of from which the object was received. In some examples, the object moderation component 116 can cause an error to be presented to a user who attempts to post an object in a disabled thread, channel, direct message, etc. That is, in at least one example, the object moderation component 116 can receive an indication of an object to be posted to a disabled thread and, based at least in part on determining that the thread is disabled, can send an error object or the like to the client of from which the object was received. In some examples, such an error object can indicate that the thread is disabled.

In some examples, one or more user interface elements can be presented via a disabled thread, channel, direct message, and/or the like to communicate to users that the thread, channel, direct message, and/or the like has been disabled. Further, in some examples, indications of threads, channels, direct messages, etc., as stored in the datastore 122, can be associated with indicators of whether such threads, channels, direct messages, etc. are disabled (or not). That is, in some examples, a disabled state can be associated with indications of disabled threads, disabled channels, disabled direct messages, etc. In some examples, even though a thread, channel, or direct message is disabled, some users (e.g., administrator users or other permissioned users) can post to the thread, channel, direct message, etc.

Figure 10:
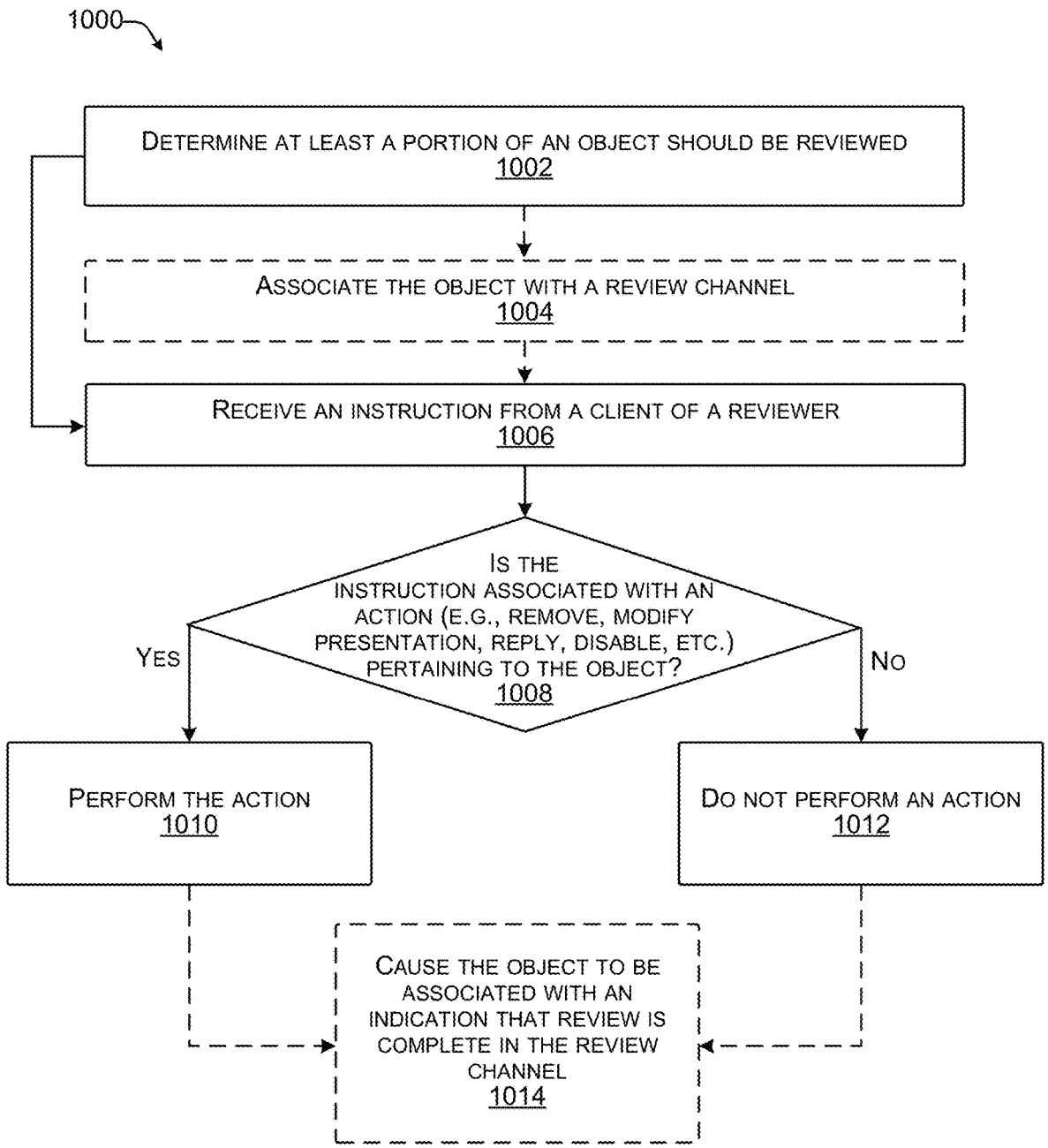
FIG. 10 illustrates another example process for moderating objects based at least in part on determinations that objects should be reviewed, as described herein.

FIG. 10 illustrates another example process 1000 for moderating objects based at least in part on determinations that objects should be reviewed, as described herein.

At operation 1002, the object moderation component 116 can determine that at least a portion of an object should be reviewed. In some examples, the object moderation component 116 can analyze data associated with objects, such as objects, to determine when an object should be reviewed (e.g., automatically/without requiring manual input). That is, in some examples, the object moderation component 116 can parse objects using natural language processing, image recognition, and/or the like. In at least one example, the object moderation component 116 can utilize one or more models, which can be trained via machine-learning mechanisms (e.g., unsupervised, semi-supervised, supervised, deep, etc.), to determine whether an object should be flagged for review. In some examples, the one or more models can be trained on other objects that have previously been posted or exchanged via the communication platform. In some examples, the model(s) can be trained to output a binary indication (e.g., flag or don't flag). In such examples, if the output is "flag," the object moderation component 116 can determine that the object, or a portion thereof, should be reviewed. In some examples, the model(s) can be trained to output a score and/or other metric. Such a score or other metric can be an indication of whether an object is off topic, out of line, inappropriate, offensive, and/or the like. In some examples, the model(s) can output individual score(s) or other metric(s). In at least one example, based at least in part on a determination that a score or other metric meets or exceeds a threshold, the object moderation component 116 can determine that an associated object should be reviewed.

As described above, in some examples, the object moderation component 116 can receive a request from a client, wherein the request indicates that at least a portion of the object should be reviewed. In some examples, the object moderation component 116 can receive such a request from another component of the server(s) 102 and/or can make such a determination on its own, for example, based at least in part on determining that the object is associated with a particular key word, image, file, or the like. In at least one example, particular key words, images, files, etc. can be designated as initiating a review process by an administrator or other user of the communication platform. In some examples, such particular key words, images, files, and/or the like can be learned using machine learning techniques.

At operation 1004, which can be optional, the object moderation component 116 can associate the object with a review channel, as described above with reference to operation 504 of FIG. 5.

At operation 1006, the object moderation component 116 can receive an instruction from a client of a reviewer, as described above with reference to operation 506 of FIG. 5.

At operation 1008, the object moderation component 116 can determine whether the instruction is associated with an action (e.g., remove, modify presentation, reply, disable, etc.) pertaining to the object, as described above with reference to operation 508 of FIG. 5.

At operation 1010, based at least in part on determining that the instruction is associated with an action, the object moderation component 116 can perform the action, as described above with reference to operation 510 of FIG. 5.

At operation 1012, the object moderation component 116 can refrain from performing an action.

At operation 1014, which can be optional, the object moderation component 116 can cause the object to be associated with an indication that review is complete in the review channel, as described above with reference to operation 514 of FIG. 5.

While techniques described herein are directed to first-party review of flagged objects, in some examples, the environment 100 can utilize one or more application programming interfaces (APIs) (e.g., public or private) to route flagged objects to additional or alternative platforms. Further, while techniques described herein relate to manual review of flagged objects, in some examples, one or more models can be used to automate at least a portion of the review process.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A. A method, implemented at least in part by one or more computing devices of a communication platform, comprising: receiving, in association with a message associated with the communication platform, a request to designate at least a portion of the message for review; in response to receiving the request, associating the message with a review channel of the communication platform, wherein one or more members of the review channel are associated with a set of permissions for reviewing messages; receiving, in association with the message and from a first client of a member of the review channel, an instruction to modify at least the portion of the message; and causing presentation of at least a modified portion of the message on a second client.

B. The method of paragraph A, wherein the message is posted to a channel, direct message, or board associated with the communication platform, wherein the message is associated with a selectable control to initiate the request, and wherein the request is received in response to an interaction with the selectable control.

C. The method of paragraph A or B, wherein the request is received from a component of the one or more computing devices, and wherein the request is initiated based at least in part on a detection, by the component, of a particular key word associated with the portion of the message.

D. The method of any of paragraphs A-C, wherein the review channel is a private channel that is not accessible to, nor viewable by, users of the communication platform that are not members of the review channel.

E. The method of any of paragraphs A-D, wherein the message, as displayed on the first client, is associated with one or more affordances to enable the member to review the message.

F. The method of paragraph E, wherein the one or more affordances are associated with one or more of (i) an input to modify presentation of at least the portion of the message, (ii) an input to reply to the message, (iii) an input to disable at least one of replies or other interactions with the message, or (iv) an input to indicate that review is complete.

G. The method of paragraph F, wherein modifying presentation of at least the portion of the message comprises obfuscating at least some text of the message.

H. The method of any of paragraphs A-G, wherein the message, as displayed on the first client, is associated with context relevant to the message.

I. The method of any of paragraphs A-H, wherein the message is associated with a shared channel associated with two or more organizations, wherein a requesting user associated with the request is associated with an organization of the two or more organizations, and wherein the review channel is associated with the organization.

J. A system comprising: one or more processors; and one or more non-transitory computer-readable media storing instructions that, when executed by the one or more processors, cause the system to perform operations comprising: receiving, in association with a message associated with a communication platform, a request to designate at least a portion of the message for review; in response to receiving the request, associating the message with a review channel of the communication platform, wherein one or more members of the review channel are associated with a set of permissions for reviewing messages; receiving, in association with the message and from a first client of a member of the review channel, an instruction to modify at least the portion of the message; and causing presentation of at least a modified portion of the message on a second client.

K. The system of paragraph J, wherein the message is posted to a channel, direct message, or board associated with the communication platform, wherein the message is associated with a selectable control to initiate the request, and wherein the request is received in response to an interaction with the selectable control.

L. The system of paragraph J or K, wherein the request is initiated based at least in part on a detection of a particular key word associated with the portion of the message.

M. The system of any of paragraphs J-L, wherein the review channel is a private channel that is not accessible to, nor viewable by, users of the communication platform that are not members of the review channel.

N. The system of any of paragraphs J-M, wherein the message, as displayed on the first client, is associated with one or more affordances to enable the member to review the message, wherein the one or more affordances are associated with one or more of (i) an input to modify presentation of at least the portion of the message, (ii) an input to reply to the message, (iii) an input to disable at least one of replies or other interactions with the message, or (iv) an input to indicate that review is complete, and wherein modifying presentation of at least the portion of the message comprises obfuscating at least some text of the message.

O. The system of any of paragraphs J-N, wherein the message, as displayed on the first client, is associated with context relevant to the message.

P. The system of any of paragraphs J-O, wherein the message is associated with a shared channel associated with two or more organizations, wherein a requesting user associated with the request is associated with an organization of the two or more organizations, and wherein the review channel is associated with the organization.

Q. One or more non-transitory computer-readable media storing instructions that, when executed by one or more processors, cause the one or more processors to perform operations comprising: receiving, in association with a message associated with a communication platform, a request to designate at least a portion of the message for review; in response to receiving the request, associating the message with a review channel of the communication platform, wherein one or more members of the review channel are associated with a set of permissions for reviewing messages; receiving, in association with the message and from a first client of a member of the review channel, an instruction to modify at least the portion of the message; and causing presentation of at least a modified portion of the message on a second client.

R. The one or more non-transitory computer-readable media of paragraph Q, wherein the message is posted to a channel, direct message, or board associated with the communication platform, wherein the message is associated with a selectable control to initiate the request, and wherein the request is received in response to an interaction with the selectable control.

S. The one or more non-transitory computer-readable media of paragraph Q or R, wherein the request is received based at least in part on a detection of a particular key word associated with the portion of the message.

T. The one or more non-transitory computer-readable media of any of paragraphs Q-S, wherein the message, as displayed on the first client, is associated with one or more affordances to enable the member to review the message, wherein the one or more affordances are associated with one or more of (i) an input to modify presentation of at least the portion of the message, (ii) an input to reply to the message, (iii) an input to disable at least one of replies or other interactions with the message, or (iv) an input to indicate that review is complete, and wherein modifying presentation of at least the portion of the message comprises obfuscating at least some text of the message.

U. A method, implemented at least in part by one or more computing devices of a communication platform, comprising: receiving, in association with a message associated with the communication platform, a request to designate the message for review; in response to receiving the request, causing the message to be presented via an instance of a user interface of the communication platform, wherein the instance of the user interface is presented via a client of a first user; receiving, from the client, an instruction to disable interaction with the message, wherein disabling interaction with the message comprises disabling further reaction or replies associated with the message; and based at least in part on receiving the instruction, disabling interaction with the message for one or more second users who are recipients of the message.

V. The method of paragraph U, wherein the message is presented via a review channel associated with the communication platform, and wherein the review channel is associated with one or more members having permission to review messages.

W. The method of paragraph U or V, wherein the message is posted to a channel, direct message, or board associated with the communication platform, and wherein the message is associated with an affordance to initiate the request.

X. The method of any of paragraphs U-W, wherein the message is associated with a thread of one or more reply messages, and wherein disabling interaction further comprises disabling further reaction associated with each reply message in the thread of one or more reply messages and disabling further reply messages associated with the message.

Y. The method of any of paragraphs U-X, further comprising based at least in part on determining that the interaction with the message is disabled, causing presentation of the message such that the message is presented with a different presentation characteristic than non-disabled messages.

Z. The method of any of paragraphs U-Y, wherein the message, as presented via the instance of the user interface, is associated with one or more affordances to enable the first user to review the message, and wherein the one or more affordances are associated with one or more of (i) an input to modify presentation of at least a portion of the message, (ii) an input to reply to the message, (iii) an input to disable interaction with the message, or (iv) an input to indicate that review is complete, and wherein the instruction is received in response to the input to disable interaction with the message.

AA. The method of any of paragraphs U-Z, further comprising: prior to receiving the instruction to disable interaction with the message, receiving, from the client, a reply message to associate with the message; and in response to receiving the reply message, causing the reply message to be displayed, in association with the message, via one or more additional instances of the user interface presented via one or more additional clients of the one or more second users.

AB. The method of any of paragraphs U-AA, wherein the message, as presented via the instance of the user interface of the communication platform, is associated with an indication of the user who requested the message be reviewed.

AC. A system comprising: one or more processors; and one or more non-transitory computer-readable media storing instructions that, when executed by the one or more processors, cause the system to perform operations comprising: receiving, in association with a message associated with a communication platform, a request to designate the message for review; in response to receiving the request, causing the message to be presented via an instance of a user interface of the communication platform, wherein the instance of the user interface is presented via a client of a first user; receiving, from the client, an instruction to disable interaction with the message, wherein disabling interaction with the message comprises disabling further reaction or replies associated with the message; and based at least in part on receiving the instruction, disabling interaction with the message for one or more second users who are recipients of the message.

AD. The system of paragraph AC, wherein the message is presented via a review channel associated with the communication platform, and wherein the review channel is associated with one or more members having permission to review messages.

AE. The system of paragraph AC or AD, wherein the message is posted to a channel, direct message, or board associated with the communication platform, and wherein the message is associated with an affordance to initiate the request.

AF. The system of any of paragraphs AC-AE, wherein the message is associated with a thread of one or more reply messages, and wherein disabling interaction further comprises disabling further reaction associated with each reply message in the thread of one or more reply messages and disabling further reply messages associated with the message.

AG. The system of any of paragraphs AC-AF, the operations further comprising based at least in part on determining that the interaction with the message is disabled, causing presentation of the message such that the message is presented with a different presentation characteristic than non-disabled messages.

AH. The system of any of paragraphs AC-AG, wherein the message, as presented via the instance of the user interface, is associated with one or more affordances to enable the first user to review the message, and wherein the one or more affordances are associated with one or more of (i) an input to modify presentation of at least a portion of the message, (ii) an input to reply to the message, (iii) an input to disable interaction with the message, or (iv) an input to indicate that review is complete, and wherein the instruction is received in response to the input to disable interaction with the message.

AI. The system of any of paragraphs AC-AH, the operations further comprising: prior to receiving the instruction to disable interaction with the message, receiving, from the client, a reply message to associate with the message; and in response to receiving the reply message, causing the reply message to be displayed, in association with the message, via one or more additional instances of the user interface presented via one or more additional clients of the one or more second users.

AJ. The system of any of paragraphs AC-AI, wherein the message, as presented via the instance of the user interface of the communication platform, is associated with an indication of the user who requested the message be reviewed.

AK. One or more non-transitory computer-readable media storing instructions that, when executed by one or more processors, cause the one or more processors to perform operations comprising: receiving, in association with a message associated with a communication platform, a request to designate the message for review; in response to receiving the request, causing the message to be presented via an instance of a user interface of the communication platform, wherein the instance of the user interface is presented via a client of a first user; receiving, from the client, an instruction to disable interaction with the message, wherein disabling interaction with the message comprises disabling further reaction or replies associated with the message; and based at least in part on receiving the instruction, disabling interaction with the message for one or more second users who are recipients of the message.

AL. The one or more non-transitory computer-readable media of paragraph AK, wherein the message is presented via a review channel associated with the communication platform, and wherein the review channel is associated with one or more members having permission to review messages.

AM. The one or more non-transitory computer-readable media of paragraph AK or paragraph AL, wherein the message is associated with a thread of one or more reply messages, and wherein disabling interaction further comprises disabling further reaction associated with each reply message in the thread of one or more reply messages and disabling further reply messages associated with the message.

AN. The one or more non-transitory computer-readable media of any of paragraphs AK-AM, the operations further comprising: prior to receiving the instruction to disable interaction with the message, receiving, from the client, a reply message to associate with the message; and in response to receiving the reply message, causing the reply message to be displayed, in association with the message, via one or more additional instances of the user interface presented via one or more additional clients of the one or more second users.

While the example clauses described above are described with respect to one particular implementation, it should be understood that, in the context of this document, the content of the example clauses can also be implemented via a method, device, system, a computer-readable medium, and/ or another implementation. Additionally, any of examples A-AN may be implemented alone or in combination with any other one or more of the examples A-AN.

What is claimed is:

1. A method, implemented at least in part by one or more computing devices of a communication platform, comprising:
    receiving, in association with a message posted within a first virtual space associated with the communication platform, a request to designate at least a portion of the message for review;
    in response to receiving the request, causing the message posted in the first virtual space to be presented within a second virtual space of the communication platform with context data associated with the message, wherein the second virtual space was previously designated for reviewing messages and wherein one or more members of the second virtual space are associated with a set of permissions for reviewing the messages within the second virtual space, wherein the set of permissions identify a role or a user type associated with the one or more members that authorize the one or more members to access the second virtual space and to review the messages, and wherein users of the communication platform that lack the role or the user type are not authorized to access the second virtual space and to review the messages;
    in response to receiving the request, disabling interaction with the message for a limited period of time;
    receiving, in association with the message and from a first client of a member of the second virtual space, input data indicating an action to be performed with respect to the message; and
    performing, based at least in part on the input data, the action with respect to the message.

2. The method as recited in claim 1, wherein receiving the request comprises receiving, via a user interface of the communication platform in which the first virtual space is being presented, a selection of a selectable element indicating that the message is to be reported for review.

3. The method as recited in claim 1, wherein the message remains visible within the first virtual space after the request is received and until the input data is received or the action is performed.

4. The method as recited in claim 1, wherein the action includes at least one of deleting the message or the at least the portion of the message, modifying the message or the at least the portion of the message, or obfuscating the message or the at least the portion of the message.

5. The method as recited in claim 1, further comprising:
    in response to receiving the request, copying the message from the first virtual space to the second virtual space for review by the one or more members; and
    in response to the action being performed, presenting a notification in association with the message within the first virtual space.

6. The method as recited in claim 1, wherein the message and the context data exclude an identity or an identifier associated with a user that sent the request, such that the user remains anonymous with respect to the one or more members.

7. The method as recited in claim 1, further comprising:
    sending, to a first user that sent the request, a first notification associated with the action; and
    sending, to a second user that posted the message within the first virtual space, a second notification associated with at least one of the request or the action.

8. The method as recited in claim 1, wherein:
    the action is identified based at least in part on one or more keywords detected within the message or the at least the portion of the message; and
    the first virtual space is a channel and the second virtual space is a private channel that is not accessible to, nor viewable by, the users of the communication platform that are not included in the one or more members of the second virtual space.

9. The method as recited in claim 1, wherein the context data includes an identifier of the first virtual space in which the message was posted, a first identification of a first user that posted the message, a second identification of a second user that designated the at least the portion of the message for review, and one or more interactions with the message, wherein the one or more interactions include an extent to which one or more users have responded to, and interacted with, the message.

10. The method as recited in claim 1, wherein disabling the interaction with the message comprises preventing members of the first virtual space from responding to, and interacting with, the message for the limited period of time.

11. The method as recited in claim 1, wherein disabling the interaction with the message comprises preventing members of the first virtual space from posting messages within the first virtual space for the limited period of time.

12. A system comprising:
    memory;
    one or more processors; and
    one or more computer-executable instructions that are stored in the memory and that are executable by the one more processors to perform operations comprising:
        receiving, in association with a message posted within a first virtual space associated with a communication platform, a request to designate at least a portion of the message for review;
        in response to receiving the request, causing the message posted in the first virtual space to be presented within a second virtual space of the communication platform with context data associated with the message, wherein the second virtual space was previously designated for reviewing messages and wherein one or more members of the second virtual space are associated with a set of permissions for reviewing the messages within the second virtual space, wherein the set of permissions identify a role or a user type associated with the one or more members that authorize the one or more members to access the second virtual space and to review the messages, and wherein users of the communication platform that lack the role or the user type are not authorized to access the second virtual space and to review the messages;
        in response to receiving the request, disabling interaction with the message;
        receiving, in association with the message and from a first client of a member of the second virtual space, input data indicating an action to be performed with respect to the message; and
        performing, based at least in part on the input data, the action with respect to the message.

13. The system as recited in claim 12, wherein receiving the request comprises receiving, via a user interface of the communication platform in which the first virtual space is being presented, a selection of a selectable element indicating that the message is to be reported for review.

14. The system as recited in claim 12, wherein the message remains visible within the first virtual space after the request is received and until the input data is received or the action is performed.

15. The system as recited in claim 12, wherein the action includes at least one of deleting the message or the at least the portion of the message, modifying the message or the at least the portion of the message, or obfuscating the message or the at least the portion of the message.

16. One or more non-transitory computer-executable instructions that, when executed by one or more processors, cause the one more processors to perform operations comprising:

receiving, in association with a message posted within a first virtual space associated with a communication platform, a request to designate at least a portion of the message for review, wherein the first virtual space includes one or more first members associated with a first organization and one or more second members associated with a second organization;

determining that a user that sent the request is included in the one or more first members;

in response to receiving the request, causing the message posted in the first virtual space to be presented within a second virtual space of the communication platform with context data associated with the message, wherein the second virtual space is associated with the first organization and was previously designated for reviewing messages and wherein one or more third members of the second virtual space are associated with a set of permissions for reviewing the messages within the second virtual space, wherein the set of permissions identify a role or a user type associated with the one or more third members that authorize the one or more third members to access the second virtual space and to review the messages, and wherein users of the communication platform that lack the role or the user type are not authorized to access the second virtual space and to review the messages;

receiving, in association with the message and from a first client of a member of the second virtual space, input data indicating an action to be performed with respect to the message; and performing, based at least in part on the input data, the action with respect to the message.

17. The one or more non-transitory computer-executable instructions as recited in claim 16, wherein the operations further comprise:

in response to receiving the request, copying the message from the first virtual space to the second virtual space for review by the one or more third members; and in response to the action being performed, presenting a notification in association with the message within the first virtual space.

18. The one or more non-transitory computer-executable instructions as recited in claim 16, wherein:

the message and the context data exclude an identity or an identifier associated with the user that sent the request, such that the user remains anonymous with respect to the one or more third members; and the first virtual space is a channel and the second virtual space is a private channel that is not accessible to, nor viewable by, the users of the communication platform that are not included in the one or more third members of the second virtual space.

19. The one or more non-transitory computer-executable instructions as recited in claim 16, wherein the operations further comprise:

sending, to the user that sent the request, a first notification associated with the action; and sending, to a second user that posted the message within the first virtual space, a second notification associated with at least one of the request or the action.

20. The one or more non-transitory computer-executable instructions as recited in claim 16, wherein the action is identified based at least in part on one or more keywords detected within the message or the at least the portion of the message.

* * * * *